(12) United States Patent
Eng et al.

(10) Patent No.: US 12,440,497 B2
(45) Date of Patent: Oct. 14, 2025

(54) COMPOSITIONS AND METHODS FOR ENHANCING Wnt SIGNALING FOR TREATING CANCER

(71) Applicants: Massachusetts Institute of Technology, Cambridge, MA (US); The General Hospital Corporation, Boston, MA (US)

(72) Inventors: George Eng, Cambridge, MA (US); Omer Yilmaz, Cambridge, MA (US); Jonathan Braverman, Cambridge, MA (US)

(73) Assignees: MASSACHUSETTS INSTITUTE OF TECHNOLOGY, Cambridge, MA (US); THE GENERAL HOSPITAL CORPORATION, Boston, MA (US)

( * ) Notice: Subject to any disclaimer, the term of this patent is extended or adjusted under 35 U.S.C. 154(b) by 0 days.

(21) Appl. No.: 18/045,059

(22) Filed: Oct. 7, 2022

(65) Prior Publication Data
US 2023/0190767 A1 Jun. 22, 2023

Related U.S. Application Data

(60) Provisional application No. 63/253,380, filed on Oct. 7, 2021.

(51) Int. Cl.
| | | |
|---|---|---|
| *A61K 31/5517* | (2006.01) | |
| *A61K 31/497* | (2006.01) | |
| *A61K 31/5377* | (2006.01) | |
| *A61K 38/17* | (2006.01) | |
| *A61K 45/06* | (2006.01) | |
| *A61P 1/00* | (2006.01) | |
| *A61P 35/00* | (2006.01) | |
| *C07K 14/475* | (2006.01) | |

(52) U.S. Cl.
CPC ........ *A61K 31/5517* (2013.01); *A61K 31/497* (2013.01); *A61K 31/5377* (2013.01); *A61K 38/1709* (2013.01); *A61K 45/06* (2013.01); *A61P 1/00* (2018.01); *A61P 35/00* (2018.01); *C07K 14/475* (2013.01)

(58) Field of Classification Search
CPC .............. A61K 31/5517; A61K 31/497; A61K 38/1709; A61K 45/06; A61P 1/00; A61P 35/00
See application file for complete search history.

(56) References Cited

U.S. PATENT DOCUMENTS

| | | | |
|---|---|---|---|
| 2010/0022680 A1 | 1/2010 | Karnik | |
| 2013/0096169 A1* | 4/2013 | Yu ......................... | A61K 31/15 514/393 |

OTHER PUBLICATIONS

Khan (Can we safely target the WNT pathway?), nature Reviews, vol. 13, Jul. 2014.*
Sahin (Glycogen synthase kinase-3 beta inhibitors as novel cancer treatment and modulators of antitumor immune responses), Cancer Biology & Therapy, vol. 20, No. 8, 1047-1056, 2019.*
Clevers, "Wnt/β-Catenin Signaling in Development and Disease", Cell, 127: 469-480 (2006).
Fearnhead, et al., "Genetics of colorectal cancer: hereditary aspects and overview of colorectal tumorigenesis", Br Med Bull, 64: 27-43 (2002).
Hervas-Stubbs, et al., "CD8 T Cell Priming in the Presence of IFN-α Renders CTLs with Improved Responsiveness to Homeostatic Cytokines and Recall Antigens: Important Traits for Adoptive T Cell Therapy", J. Immunol., 189(7): 3299-3310 (2012).
Kwong, et al., "APC and Its Modifiers in Colon Cancer", Advances in experimental medicine and biology, 656: 85-106 (2009).
Ledford, et al., "Therapeutic cancer vaccine survives biotech bust: pharmaceutical company rescues landmark prostate-cancer treatment, Provenge", Nature, 519: 17-18 (2015).
Logan and Nusse, "The Wnt Signaling Pathway in Development and Disease", Annu. Rev. Cell Dev. Biol., 20: 781-810 (2004).
MacDonald, et al.,"Wnt/β-Catenin Signaling: Components, Mechanisms, and Diseases", Dev. Cell, 17: 9-26 (2009).
Mancinelli, et al., "Multifaceted Roles of GSK-3 in Cancer and Autophagy-Related Diseases", Oxidative Medicine and Cellular Longevity, 2017: 4629495 (2017).
The Cancer Genome Atlas Network, "Comprehensive molecular characterization of human colon and rectal cancer", Nature, 487: 330-337 (2012).
Palucka, et al., "Cancer immunotherapy via dendritic cells", Nature Reviews Cancer, 12: 265-277 (2012).
Vidri and Fitzgerald, "GSK-3: An important kinase in colon and pancreatic cancers", Biochimica et Biophysica Acta (BBA)—Molecular Cell Research, 1867(4): 118626 (2020).
Wang, et al, "Adoptive transfer of tumor-primed, in vitro-activated, CD4+ T effector cells (TEs) combined with CD8+ TEs provides intratumoral TE proliferation and synergistic antitumor response", Blood, 109(11): 4865-4872 (2007).

(Continued)

*Primary Examiner* — Zohreh A Fay
(74) *Attorney, Agent, or Firm* — PABST PATENT GROUP LLP

(57) ABSTRACT

Methods and compositions for enhancing Wnt signaling pathway activities in a tissue of a subject have been developed for the treatment of cancer, in particular cancers with one or more mutations in the APC (adenomatous polyposis coli) gene. Preferably, the amount of the compositions for enhancing Wnt signaling does not reduce or inhibit proliferation or viability of normal healthy cells in the subject. In some embodiments, pharmaceutical compositions including an effective amount of one or more GSK-3 inhibitors are administered to reduce cancer cell proliferation or viability in a subject. A preferred GSK-3 inhibitor is LY2090314 encapsulated within, or associated with nanoparticles. Dosage forms of LY2090314 encapsulated within, or associated with nanoparticles for administration are also described.

33 Claims, 13 Drawing Sheets
Specification includes a Sequence Listing.

(56) References Cited

OTHER PUBLICATIONS

International Search Report PCT/US2022/077746 dated Jan. 13, 2023.
Cervello, et al.,"Pivotal roles of glycogen synthase-3 in hepatocellular carcinoma", Adv. Biol. Regul., 65: 59-76 (2017).
Kennell and Cadigan, "APC and β-Catenin Degradation", Adv. Exp. Med. Biol., 656: 1-12 (2009).
Noubissi, et al., "CRD-BP mediates stabilization of βTrCP1 and c-myc mRNA in response to β-catenin signalling", Nature, 441: 898-901 (2006).
Takahashi-Yanaga, "Activator or inhibitor? GSK-3 as a new drug target", Biochem. Pharmacol., 86: 191-199 (2013).
Zamek-Gliszczynski, et al., "Pharmacokinetics, Metabolism, and Excretion of the Glycogen Synthase Kinase-3 Inhibitor LY2090314 in Rats, Dogs, and Humans: A Case Study in Rapid Clearance by Extensive Metabolism with Low Circulating Metabolite Exposure", Drug Metab Dispos, 41(4): 714-726 (2013).

\* cited by examiner

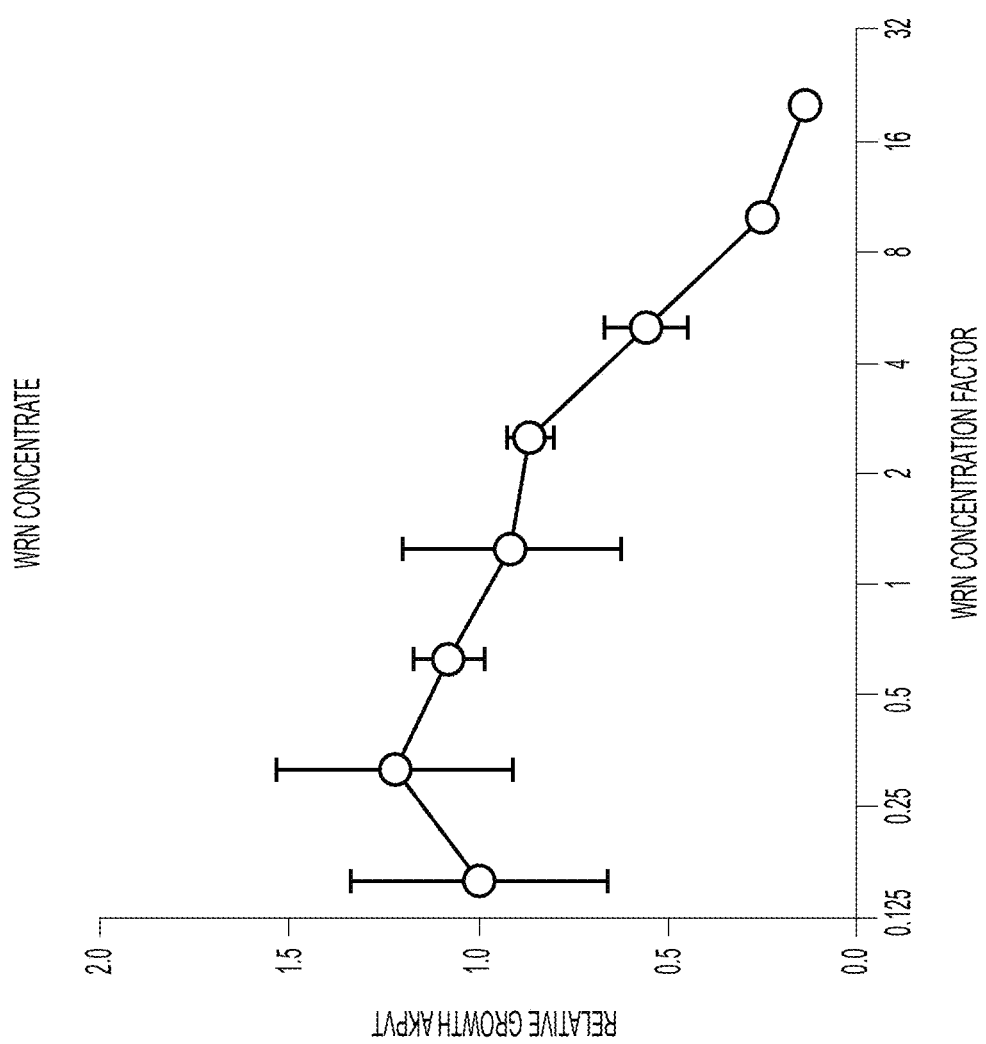

SEQUENCE LISTING

```
Sequence total quantity: 4
SEQ ID NO: 1            moltype = AA  length = 385
FEATURE                 Location/Qualifiers
source                  1..385
                        mol_type = protein
                        organism = Homo sapiens
SEQUENCE: 1
MAPLGYFLLL CSLKQALGSY PIWWSLAVGP QYSSLGSQPI LCASIPGLVP KQLRFCRNYV   60
EIMPSVAEGI KIGIQECQHQ FRGRRWNCTT VHDSLAIFGP VLDKATRESA FVHAIASAGV  120
AFAVTRSCAE GTAAICGCSS RHQGSPGKGW KWGGCSEDIE FGGMVSREFA DARENRPDAR  180
SAMNRHNNEA GRQAIASHMH LKCKCHGLSG SCEVKTCWWS QPDFRAIGDF LKDKYDSASE  240
MVVEKHRESR GWVETLRPRY TYFKVPTERD LVYYEASPNF CEPNPETGSF GTRDRTCNVS  300
SHGIDGCDLL CCGRGHNARA ERRREKCRCV FHWCCYVSCQ ECTRVYDVHT CKNPGSRAGN  360
SAHQPPHPQP PVRFHPPLRR AGKVP                                        385

SEQ ID NO: 2            moltype = AA  length = 985
FEATURE                 Location/Qualifiers
source                  1..985
                        mol_type = protein
                        organism = synthetic construct
SEQUENCE: 2
MAPLGYFLLL CSLKQALGSY PIWWSLAVGP QYSSLGSQPI LCASIPGLVP KQLRFCRNYV   60
EIMPSVAEGI KIGIQECQHQ FRGRRWNCTT VHDSLAIFGP VLDKATRESA FVHAIASAGV  120
AFAVTRSCAE GTAAICGCSS RHQGSPGKGW KWGGCSEDIE FGGMVSREFA DARENRPDAR  180
SAMNRHNNEA GRQAIASHMH LKCKCHGLSG SCEVKTCWWS QPDFRAIGDF LKDKYDSASE  240
MVVEKHRESR GWVETLRPRY TYFKVPTERD LVYYEASPNF CEPNPETGSF GTRDRTCNVS  300
SHGIDGCDLL CCGRGHNARA ERRREKCRCV FHWCCYVSCQ ECTRVYDVHT CKGSGEGRGS  360
LLTCGDVEEN PGPMKLLKLT GFIFFLFFLT ESLTLPTQPR DIENFNSTQK FIEDNIEYIT  420
IIAFAQYVQE ATFEEMEKLV KDMVEYKDRC MADKTLPECS KLPNNVLQEK ICAMEGLPQK  480
HNFSHCCSKV DAQRRLCFFY NKKSDVGFLP PFPTLDPEEK CQAYESNRES LLNHFLYEVA  540
RRNPFVFAPT LLTVAVHFEE VAKSCCEEQN KVNCLQTRAI PVTQYLKAFS SYQKHVCGAL  600
LKFGTKVVHF IYIAILSQKF PKIEFKELIS LVEDVSSNYD GCCEGDVVQC IRDTSKVMNH  660
ICSKQDSISS KIKECCEKKI PERGQCIINS NKDDRPKDLS LREGKFTDSE NVCQERDADP  720
```

```
DTFFAKFTFE YSRRHPDLSI PELLRIVQIY KDLLRNCCNT ENPPGCYRYA EDKFNETTEK    780
SLKMVQQECK HFQNLGKDGL KYHYLIRLTK IAPQLSTEEL VSLGEKMVTA FTTCCTLSEE    840
FACVDNLADL VFGELCGVNE NRTINPAVDH CCKTNFAFRR PCFESLKADK TYVPPPFSQD    900
LFTFHADMCQ SQNEELQRKT DRFLVNLVKL KHELTDEELQ SLFTNFANVV DKCCKAESPE    960
VCFNEESPKI GNENLYFQGH HHHHH                                         985

SEQ ID NO: 3            moltype = AA  length = 381
FEATURE                 Location/Qualifiers
source                  1..381
                        mol_type = protein
                        organism = synthetic construct
SEQUENCE: 3
MAPLGYFLLL CSLKQALGSY PIWWSLAVGP QYSSLGSQPI LCASIPGLVP KQLRFCRNYV     60
EIMPSVAEGI KIGIQECQHQ FRGRRWNCTT VHDSLAIFGP VLDKATRESA FVHAIASAGV    120
APAVTRSCAE GTAAICGCSS RHQGSPGKGW KWGGCSEDIE FGGMVSREFA DARENRPDAR    180
SAMNRHNNEA GRQAIASHMM LKCKCHGLSG SCEVKTCWWS QPDFRAIGDF LKDKYDSASE    240
MVVEKHRESR GWVETLRPRY TYFKVPTERD LVYYEASPNF CEPNPETGSF GTRDRTCNVS    300
SHGIDGCDLL CCGRGHNARA ERRREKCRCV FHWCCYVSCQ ECTRVYDVHT CKENLYFQGS    360
GGGGSGGGGS GGGGSHHHHH H                                             381

SEQ ID NO: 4            moltype = AA  length = 285
FEATURE                 Location/Qualifiers
source                  1..285
                        mol_type = protein
                        organism = synthetic construct
SEQUENCE: 4
MHLRLISWLF IILNFMEYIG SQNASRGRRQ RRMHPNVSQG CQGGCATCSD YNGCLSCKPR     60
LFFALERIGM KQIGVCLSSC PSGYYGTRYP DINKCTKCKA DCDTCFNKNF CTKCKSGFYL    120
HLGKCLDNCP EGLEANNHTM ECVSIVHCEV SEWNPWSPCT KKGKTCGFKR GTETRVREII    180
QHPSAKGNLC PPTNETRKCT VQRKKCQKGE RGKKGRERKR KKPNKGESKE AIPDSKSLES    240
SKEIPEQREN KQQQKKRKVQ DKQKSVSVST VHENLYFQGH HHHHH                   285
```

COMPOSITIONS AND METHODS FOR ENHANCING Wnt SIGNALING FOR TREATING CANCER

CROSS-REFERENCE TO RELATED APPLICATIONS

This application claims the benefit of and priority to U.S. Ser. No. 63/253,380, filed on Oct. 7, 2021, which is incorporated by reference herein in its entirety.

STATEMENT REGARDING FEDERALLY SPONSORED RESEARCH

This invention was made with government support under Grant Nos. R01 CA211184 and R01 CA254314 awarded by the National Institutes of Health. The government has certain rights in the invention.

REFERENCE TO SEQUENCE LISTING

The Sequence Listing submitted as an xml file named "MIT_23378.xml," created on Oct. 6, 2022, and having a size of 6,332 bytes is hereby incorporated by reference pursuant to 37 C.F.R. § 1.834(c)(1).

FIELD OF THE INVENTION

The invention is generally in the field of antitumor compositions and methods thereof, most particularly use of small molecule GSK inhibitors for modulating the Wnt signaling pathway to treat cancers, especially colon cancer.

BACKGROUND OF THE INVENTION

Colorectal cancer (CRC) is the second leading cause of cancer morbidity and mortality worldwide. Almost half of the population will develop at least one benign adenomatous colonic polyp during life, with less than 3% of those cases going on to develop colorectal cancer. Because symptoms are rare until very late stages, most cases go undetected. Colon cancer manifests itself as polypoid growths that progress to malignancy; then metastasize to the lymph nodes, liver, and lung. These are the primary cause of death in patients with advanced disease.

The Wnt signaling pathway is essential for cell proliferation, cell polarity, developmental cell-fate determination, and tissue homeostasis (Logan, C. Y. & Nusse, R. Annu. Rev. Cell Dev. Biol. 20, 781-810 (2004)). As a result, deregulation of Wnt signaling is often associated with cancer and other diseases (Clevers, H. Cell 127, 469-480 (2006); MacDonald, B. T. et al., Dev. Cell 17, 9-26 (2009)). Notably, over 90% of colorectal cancers (CRC) have mutations that activate the Wnt pathway, with over 80% containing mutations in the Wnt antagonist Adenomatous Polyposis Coli (APC) (Nature 487, 330-337 (2012)). Human APC mutations commonly arise in a central region of the open reading frame, referred to as the "mutation cluster region" (MCR), resulting in a truncated protein product. APC truncation results in loss of multiple β-catenin binding sites (20R), Axin interaction sites (SAMP), nuclear localization sequences, and a C-terminal basic region which mediates cytoskeletal interactions. Germline or sporadic APC mutations in colon stem cells lead to polyp formation and are considered initiating events in colorectal tumorigenesis. In the context of Wnt signaling, it is well established that APC acts as a scaffold in the β-catenin destruction complex.

Colon cancer closely follows the paradigm of a single "gatekeeper gene." Mutations inactivating the APC (adenomatous polyposis coli) gene are found in approximately 80% of all human colon tumors, and heterozygosity for such mutations produces an autosomal dominant colon cancer predisposition in humans and in murine models. APC mutations and hypermethylation have also been found in various other cancer types, including pancreatic and gastric cancers. Wnt/0-catenin signaling is essential for intestinal homeostasis and is aberrantly activated in most CRC through mutation of the tumor suppressor APC. APC is an essential component of a cytoplasmic protein complex that targets β-catenin for destruction.

The central lesions in both hereditary and sporadic colon tumors result in activation of the Wnt signaling pathway (Kennell J. A. and Cadigan, K. M. Adv. Exp. Med. Biol. 656: 1-12 (2009)). In nearly all tumors, deactivating APC or GSK3β mutations or stabilizing CTNNB1 (encoding β-catenin) mutations are present (Fearnhead N S, et al., Br Med Bull. 64:27-43 (2002)). More specifically, the canonical tumor suppressor function of APC is to form a "destruction complex" with Axin/Axin2 and GSK-3β that promotes the ubiquitination and subsequent proteasomal degradation of the oncogene 0-catenin in the absence of Wnt signaling. Loss of APC function results in an accumulation of β-catenin, which translocates to the nucleus and engages the Tcf/Lef transcription factor complex to activate transcription of a large number of target genes including cyclinD1, c-myc, and CRD-BP (Noubissi F K, et al., Nature. 441:898-901 (2006)). The tumorigenic consequences of unregulated (3-catenin activity may be related to both the direct stimulation of cellular growth and proliferation, and to the disruption of differentiation programs.

The complexity of molecular pathways in colon cancer presents a challenge to clinical therapies. Even though survival for patients diagnosed early with colon cancer is often excellent, the incidence of colon cancers continues to increase, especially among the young. Therefore, there is a need for new and effective treatments for colon cancer and other cancers associated with APC dysregulation and hypermethylation.

It is an object of the invention to provide compositions and methods for use thereof for treatment of colon cancers.

It is another object of the invention to provide compositions and methods for treating cancers associated with mutations inactivating the APC gene.

It is yet another object of the invention to provide compositions and methods for treating cancers with little or no systemic toxicity.

SUMMARY OF THE INVENTION

Pharmaceutical compositions and methods of use thereof for treating cancers, in particular colon cancers associated with high Wnt signaling activity and mutations inactivating the APC gene, have been developed. The compositions deliver one or more active agents to increase Wnt signaling in cancers associated with dysregulated Wnt activity. Excessive Wnt activity beyond a threshold value in cancer cells results in diminished cancer cell proliferation and reduction in tumor burden.

Methods for treating cancer in a subject in need thereof include administering to the subject an effective amount of a composition for increasing Wnt signaling activity in cancer cells in the subject to reduce cancer cell proliferation and/or reduce cancer cell viability in the subject.

Typically, the amount of the composition does not reduce the proliferation and/or viability of healthy cells in the subject. In preferred embodiments, the composition for increasing Wnt signaling activity includes a glycogen synthase kinase 3 (GSK-3) inhibitor. An exemplary GSK-3 inhibitor includes the structure

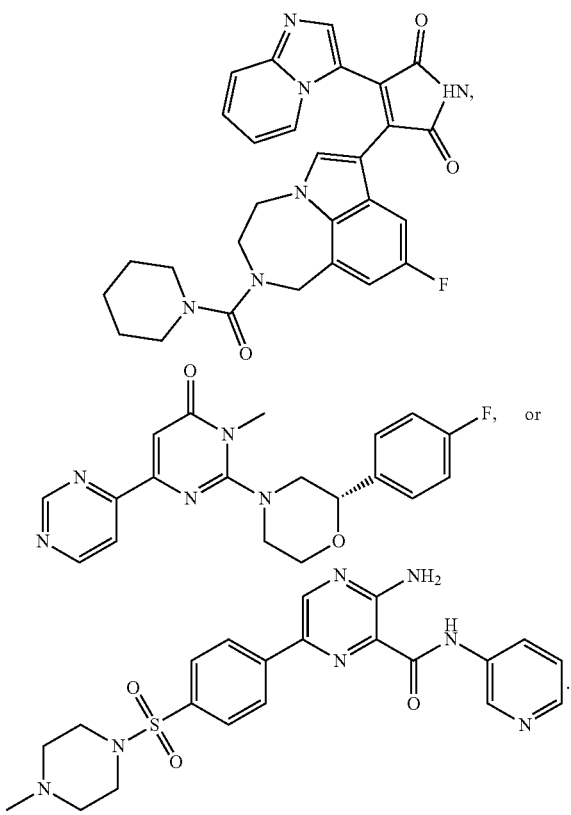

In preferred embodiments, the GSK-3 inhibitor is LY2090314, SAR502250, AZD2858, or an analogue, derivative, or prodrug thereof. Typically, the GSK-3 inhibitor is encapsulated within and/or associated with a delivery vehicle that increases the serum half-life of the GSK-3 inhibitor, as compared to the serum half-life of the same amount of the GSK-3 inhibitor alone. A preferred delivery vehicle is a polymeric nanoparticle or microparticle. In a particular embodiment, a polymeric nanoparticle includes poly(lactic-co-glycolic acid) (PLGA) and/or polyhydroxyalkanoates. In other embodiments, the composition for increasing Wnt signaling activity includes an isolated Wnt-3a protein.

Typically, the cancer cells are characterized by increased Wnt signaling activity as compared to normal control cells. In an exemplary embodiment, the cancer cells have one or more mutations in the adenomatous polyposis coli (APC) gene. The cancer can be colon cancer, rectal cancer, peritoneal carcinomatosis, pancreatic cancer, adenocarcinoma, ovarian cancer, multiple myeloma, and sarcomas of pancreas, bone, bladder, brain, breast, cervical, esophageal, kidney, liver, lung, nasopharyngeal, prostate, skin, stomach, and uterine. In a preferred embodiment, the cancer is colon cancer.

In some embodiments the methods include administering to the subject one or more additional active agents such as chemotherapeutic agents, anti-infective agents, anti-inflammatories, and diagnostic agents. In some embodiments the methods also include administering adoptive T cell therapy, surgery, or radiation therapy, and/or a cancer vaccine or immune checkpoint modulators such as PD-1 antagonists, PD-1 ligand antagonists, and CTLA4 antagonists. In an exemplary embodiment, the subject has undergone surgery to remove cancer and the composition is administered to reduce or prevent the proliferation of cancer cells in the subject, and/or to enhance the growth of normal tissue in the subject.

Methods for enhancing Wnt signaling pathway activity in cancer cells, include contacting cancer cells with an effective amount of a GSK-3 inhibitor to increase Wnt signaling in the cells. Typically, the methods reduce the proliferation and/or viability of cancer cells having one or more mutations on the APC gene. An exemplary GSK-3 inhibitor is LY2090314.

Dosage forms for injection include a GSK-3 inhibitor encapsulated in nanoparticles in an amount effective to increase Wnt signaling activity in cancer cells of a subject and reduce cancer cell proliferation and/or reduce cancer cell viability in the subject. Typically, the amount effective to increase Wnt signaling activity in cancer cells does not reduce the proliferation and/or viability of healthy cells in the subject. A preferred dosage form includes LY2090314 encapsulated in nanoparticles in an amount effective to increase Wnt signaling activity in cancer cells of a subject and reduce cancer cell proliferation and/or reduce viability of cancer cells selected from colon cancer, rectal cancer, carcinomatosis, pancreatic cancer, and adenocarcinoma. Typically, the effective amount is effective to reduce tumor size.

Kits include a GSK-3 inhibitor encapsulated in nanoparticles in an amount effective to increase Wnt signaling activity in cancer cells of a subject and reduce cancer cell proliferation and/or reduce cancer cell viability in the subject, and instructions for use according to the described methods.

Methods of making nanoparticle compositions and pharmaceutical formulations including an effective amount of one or more active agents such as one or more GSK-3 inhibitors for administration to a subject in need thereof to reduce tumor growth or tumor size are also provided. Methods of purifying PEGproteins more efficiently have also been developed.

Pharmaceutical including an effective amount of a combination of a GSK-3 inhibitor and a Wnt agonist can be administered together or separately. Methods of selecting and treating subjects with cancers are also provided. Typically, administration of the combination of the two active agents (i.e., a GSK-3 inhibitor and a Wnt agonist) is effective to reduce cancer cell proliferation or viability, or one or more associated symptoms, to a greater degree or for longer duration than administering to the subject the same amount of GSK-3 inhibitor alone or the same amount of Wnt agonist alone. In the most preferred embodiments, the reduction in cancer cell proliferation or viability in the subject with cancer is more than the additive reduction achieved by administering the GSK-3 inhibitor and the Wnt agonist alone. In some subjects with tumors, the combination is effective to reduce tumor burden, reduce tumor progression, reduce the rate of tumor cell proliferation, or a combination thereof. Exemplary GSK-3 inhibitors include LY2090314, SAR502250, AZD2858, or an analogue, derivative, or prodrug thereof. Exemplary Wnt agonist comprises an isolated R-Spondin 1 or R-Spondin 3 protein, or a derivative thereof. Methods for treating cancer in a subject in need thereof include administering to a subject an effective amount of the pharmaceutical composition for increasing Wnt signaling in cancer cells in the subject to reduce cancer cell proliferation and/or reduce cancer cell viability in the subject. Typically, the amount of the composition does not significantly reduce the proliferation and/or viability of healthy cells in the subject. In preferred embodiments, an effective amount of a GSK-3 inhibitor and a Wnt agonist is administered. Preferably, the composition does not reduce or minimally reduces the proliferation and/or viability of healthy cells in the subject. Typically, the composition is administered to the subject parenterally or enterally. In some embodiments, the GSK-3 inhibitor and the Wnt agonist are administered either orally or by injection. In some embodiments, the GSK-3 inhibitor and the Wnt agonist are administered via different routes and/or times within a treatment cycle. In preferred embodiments, the GSK-3 inhibitor and the Wnt agonist are encapsulated within and/or associated with a delivery vehicle that increases the serum half-life of the GSK-3 inhibitor and the Wnt agonist as compared to the serum half-life of the same amount of the GSK-3 inhibitor or the Wnt agonist in the absence of the delivery vehicle. Exemplary delivery vehicles include a nanoparticle or microparticle such as a liposome, a polymeric particle, a virus-like-particle, and a protein nanostructure. In preferred embodiments, the delivery vehicle is a polymeric nanoparticle which includes poly(lactic-co-glycolic acid) (PLGA) and/or polyhydroxyalkanoates. Typically, the cancer cells are characterized by increased Wnt signaling activity as compared to normal control cells, for example those have one or more mutations in the adenomatous polyposis coli (APC) gene. In some embodiments, the cancer suitable for treatment is colon cancer, rectal cancer, peritoneal carcinomatosis, pancreatic cancer, adenocarcinoma, ovarian cancer, multiple myeloma, and sarcomas, cancer of pancreas, bone, bladder, brain, breast, cervical, esophageal, kidney, liver, lung, nasopharyngeal, prostate, skin, stomach, and uterine. In one embodiment, the cancer is colon cancer.

BRIEF DESCRIPTION OF THE DRAWINGS

FIG. 5A is a graph of TdT+ tumor number per mouse, showing in Number of tumors (0-150) in each of untreated and LY nanoparticle treated samples, respectively. FIG. 5B is a graph of Mean Fluorescence per Tumor, showing Mean Fluorescence (0-80) in each of untreated and LY nanoparticle treated samples, respectively. FIG. 5C is a graph of Tumor Burden per Mouse, showing Area×Fluorescence Intensity ($0-1.5\times10^8$) in each of untreated and LY nanoparticle treated samples, respectively.

FIG. 9 is a graph of WRN (Wnt3a R-spondin3, Noggin) concentration, showing Relative Growth AKPVT (0-2.0), versus WRN concentration factor (0.125-32).

DETAILED DESCRIPTION OF THE INVENTION

I. Definitions

Figure 1:
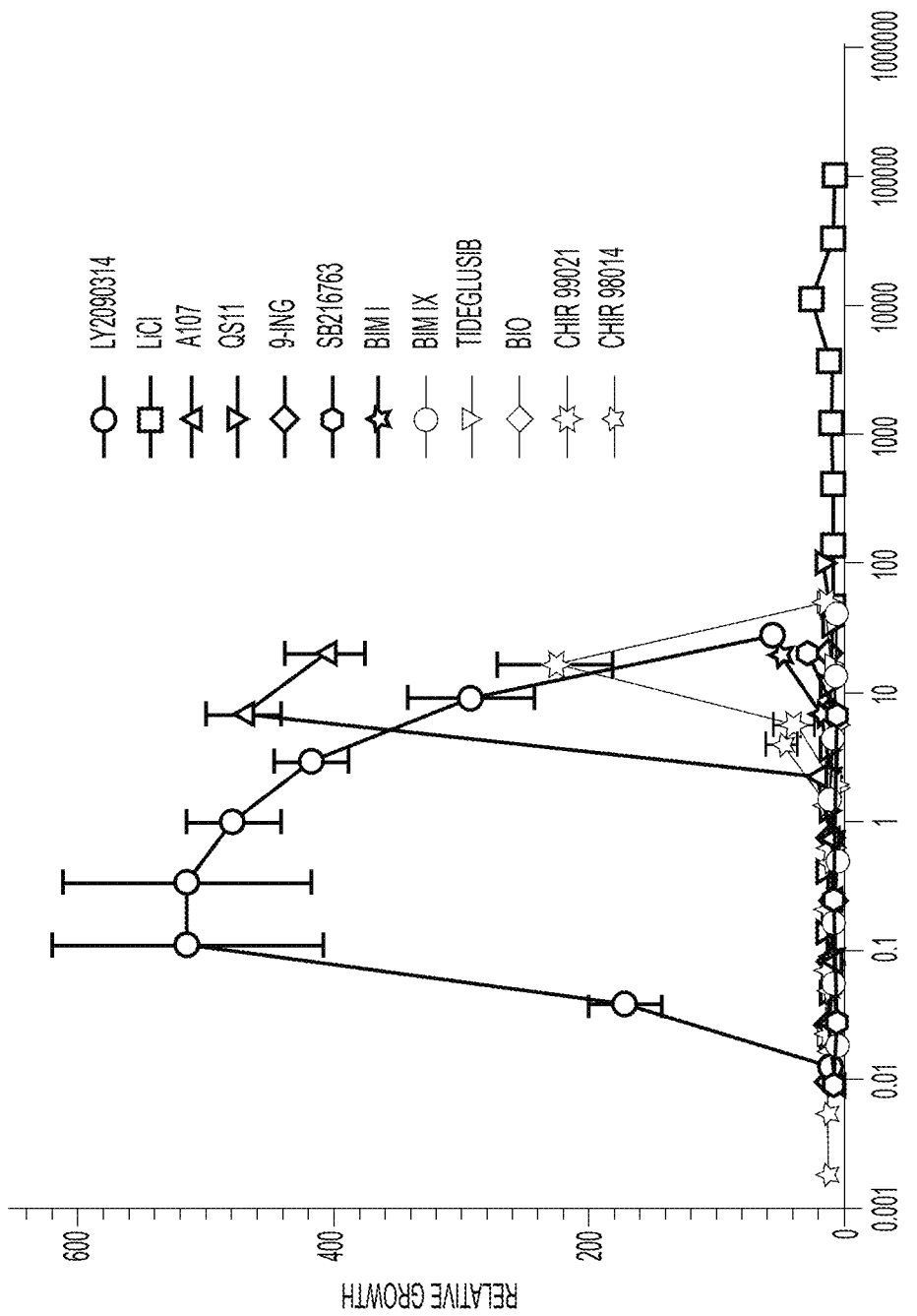
FIG. 1 is a line graph showing relative growth (0-650) of cells as a function of concentration ($Log_{10}$) for each of LY2090314 (⊟), LiCl (⊟), A107 (⊟), QS11 (⊟), 9-ING (⊟), SB216763 (⊟), BIM I (⊟), BIM IX (⊟), Tideglusib (⊟), BIO (⊟), CHIR 99021 (⊟), CHIR 98014 (⊟), respectively.

The term "dosage regime" refers to drug administration regarding formulation, route of administration, drug dose, dosing interval and treatment duration.

The terms "individual", "host", "subject", and "patient" are used interchangeably, and refer to a mammal, including, but not limited to, primates, for example, human beings, as well as rodents, such as mice and rats, and other laboratory animals.

The term "effective amount" or "therapeutically effective amount" means a dosage sufficient to treat, inhibit, or alleviate one or more symptoms of a disease state being treated or to otherwise provide a desired pharmacologic and/or physiologic effect. The precise dosage will vary according to a variety of factors such as subject-dependent variables (e.g., age, immune system health, etc.), the disease, and the treatment being administered. The effect of the effective amount can be relative to a control. Such controls are known in the art and discussed herein, and can be, for example the condition of the subject prior to or in the absence of administration of the drug, or drug combination, or in the case of drug combinations, the effect of the combination can be compared to the effect of administration of only one of the drugs.

The term "pharmaceutically acceptable" refers to those compounds, materials, compositions, and/or dosage forms which are, within the scope of sound medical judgment, suitable for use in contact with the tissues of human beings and animals without excessive toxicity, irritation, allergic response, or other problems or complications commensurate with a reasonable benefit/risk ratio. The term "pharmaceutically acceptable carrier" includes any and all solvents, dispersion media, coatings, antibacterial and antifungal agents, isotonic and absorption delaying agents, and the like. The use of such media and agents for pharmaceutically active substances is well known in the art. Except insofar as any conventional media or agent is incompatible with the active compound, use thereof in the therapeutic compositions is contemplated. Supplementary active compounds can also be incorporated into the compositions.

The term "pharmaceutically acceptable salt", as used herein, refers to derivatives of the compounds defined herein, wherein the parent compound is modified by making acid or base salts thereof. Example of pharmaceutically acceptable salts include but are not limited to mineral or organic acid salts of basic residues such as amines; and alkali or organic salts of acidic residues such as carboxylic acids. The pharmaceutically acceptable salts include the conventional non-toxic salts or the quaternary ammonium salts of the parent compound formed, for example, from non-toxic inorganic or organic acids. Such conventional non-toxic salts include those derived from inorganic acids such as hydrochloric, hydrobromic, sulfuric, sulfamic, phosphoric, and nitric acids; and the salts prepared from organic acids such as acetic, propionic, succinic, glycolic, stearic, lactic, malic, tartaric, citric, ascorbic, pamoic, maleic, hydroxymaleic, phenylacetic, glutamic, benzoic, salicylic, sulfanilic, 2-acetoxybenzoic, fumaric, toluenesulfonic, naphthalenesulfonic, methanesulfonic, ethane disulfonic, oxalic, and isethionic salts. The pharmaceutically acceptable salts of the compounds can be synthesized from the parent compound, which contains a basic or acidic moiety, by conventional chemical methods. Generally, such salts can be prepared by reacting the free acid or base forms of these compounds with a stoichiometric amount of the appropriate base or acid in water or in an organic solvent, or in a mixture of the two; generally, non-aqueous media like ether, ethyl acetate, ethanol, isopropanol, or acetonitrile are preferred. Lists of suitable salts are found in Remington's Pharmaceutical Sciences, 20th ed., Lippincott Williams & Wilkins, Baltimore, MD, 2000, p. 704; and "Handbook of Pharmaceutical Salts: Properties, Selection, and Use," P. Heinrich Stahl and Camille G. Wermuth, Eds., Wiley-VCH, Weinheim, 2002.

The term "prodrug", as used herein, refers to a pharmacological substance (drug) which is administered in an inactive (or significantly less active) form. Once administered, the prodrug is metabolized in the body (in vivo) into the active compound.

The terms "inhibit" or "reduce" in the context of inhibition, mean to reduce or decrease in activity and quantity. This can be a complete inhibition or reduction in activity or quantity, or a partial inhibition or reduction. Inhibition or reduction can be compared to a control or to a standard level. Inhibition can be 5, 10, 25, 50, 75, 80, 85, 90, 95, 99, or 100%. For example, compositions including one or more inhibitors of cancer cells may inhibit or reduce the activity and/or quantity of cancer cells by about 10%, 20%, 30%, 40%, 50%, 75%, 85%, 90%, 95%, or 99% from the activity and/or quantity of the same cells in equivalent tumor tissues of subjects that did not receive, or were not treated with the inhibitor compositions. In some embodiments, the inhibition and reduction are compared at mRNAs, proteins, cells, tissues, and organs levels. For example, an inhibition and reduction in tumor proliferation, or tumor size/volume.

The term "treating" or "preventing" a disease, disorder, or condition from occurring in an animal which may be predisposed to the disease, disorder and/or condition but has not yet been diagnosed as having it; inhibiting the disease, disorder or condition, e.g., impeding its progress; and relieving the disease, disorder, or condition, e.g., causing regression of the disease, disorder and/or condition. Treating the disease or condition includes ameliorating at least one symptom of the disease or condition, even if the underlying pathophysiology is not affected, such as treating the pain of a subject by administration of an analgesic agent even though such agent does not treat the cause of the pain. Desirable effects of treatment include decreasing the rate of disease progression, ameliorating, or palliating the disease state, and remission or improved prognosis. For example, an individual is successfully "treated" if one or more symptoms associated with cancer are mitigated or eliminated, including, but are not limited to, reducing the proliferation of cancerous cells, decreasing symptoms resulting from the disease, increasing the quality of life of those suffering from the disease, decreasing the dose of other medications required to treat the disease, delaying the progression of the disease, and/or prolonging survival of individuals.

The term "biodegradable", generally refers to a material that will degrade or erode under physiologic conditions to smaller units or chemical species that are capable of being metabolized, eliminated, or excreted by the subject. The degradation time is a function of composition and morphology.

The term "targeting moiety" means a moiety that localizes to or away from a specific locale. The moiety may be, for example, a protein, nucleic acid, nucleic acid analog, carbohydrate, or small molecule. The locale may be a tissue, a particular cell type, or a subcellular compartment. In one embodiment, the targeting moiety directs the localization of an active agent.

The term "prolonged residence time" means an increase in the time required for an agent to be cleared from a patient's body, or organ or tissue of that patient. In certain embodiments, "prolonged residence time" refers to an agent that is cleared with a half-life that is 10%, 20%, 50% or 75% longer than a standard of comparison such as a comparable agent without association with or encapsulation within a delivery vehicle such as a nanoparticle. In certain embodiments, "prolonged residence time" refers to an agent that is cleared with a half-life of 2, 5, 10, 20, 50, 100, 200, 500, 1000, 2000, 5000, or 10000 times longer than a standard of comparison such as a comparable agent without a nanoparticle that specifically target specific cell types associated with tumors.

The terms "incorporated" and "encapsulated" refer to incorporating, formulating, or otherwise including an active agent into and/or onto a composition that allows for controlled release, such as sustained release, of such agent in the desired application. The active agent or other material can be incorporated into a particle by enveloping the agent within the particle structure, encapsulated inside the particle structure, the interior, or to one or more surface functional groups of such particle (by covalent, ionic, or other binding interaction), physical admixture, etc.

The term "Wnt signaling" or "Wnt signaling activity" or Wnt signaling pathway activity" are used interchangeably and refer to the group of signal transduction pathways which begin with proteins that pass signals into a cell through cell surface receptors. The term "Wnt pathway" refers to any one of the three Wnt signaling pathways, including the canonical Wnt pathway, the noncanonical planar cell polarity pathway, and the noncanonical Wnt/calcium pathway that are activated by the binding of a Wnt-protein ligand to a Frizzled family receptor. Exemplary assays used to assess activities of the Wnt signaling pathway include TCF/LEF Reporter kit which is a functional readout for Beta catenin binding to the TCF LEF transcription factor binding domain with reporter activity; or by stem cell growth via wild type organoids. In some embodiments, the activities of the Wnt signaling pathway are assessed using a stable reporter expressing cell lines using luminescence or fluorescence.

II. Compositions

A. Compounds Increasing Wnt Activity or Levels
Wnt Pathway

Wnt signaling begins when a Wnt protein binds to the N-terminal extra-cellular cysteine-rich domain of a Frizzled (Fz) family receptor. These receptors span the plasma membrane seven times and constitute a distinct family of G-protein coupled receptors (GPCRs). However, to facilitate Wnt signaling, co-receptors may be required alongside the interaction between the Wnt protein and Fz receptor. Examples include lipoprotein receptor-related protein (LRP)-5/6, receptor tyrosine kinase (RTK), and ROR2. Upon activation of the receptor, a signal is sent to the phosphoprotein Dishevelled (Dsh), which is located in the cytoplasm. This signal is transmitted via a direct interaction between Fz and Dsh. Dsh proteins are present in all organisms, and all share the following highly conserved protein domains: an amino-terminal DIX domain, a central PDZ domain, and a carboxy-terminal DEP domain. These different domains are important because after Dsh, the Wnt signal can branch off into multiple pathways and each pathway interacts with a different combination of the three domains.

The three best characterized Wnt signaling pathways are the canonical Wnt pathway, the noncanonical planar cell polarity pathway, and the noncanonical Wnt/calcium pathway. As their names suggest, these pathways belong to one of two categories: canonical or noncanonical. The difference between the categories is that a canonical pathway involves the protein β-catenin while a noncanonical pathway operates independently of it. The canonical Wnt pathway (or Wnt/β-catenin pathway) is the Wnt pathway that causes an accumulation of β-catenin in the cytoplasm and its eventual translocation into the nucleus to act as a transcriptional coactivator of transcription factors that belong to the TCF/LEF family. Without Wnt, β-catenin would not accumulate in the cytoplasm since a destruction complex would normally degrade it. This destruction complex includes the following proteins: Axin, adenomatosis polyposis coli (APC), protein phosphatase 2A (PP2A), glycogen synthase kinase 3 (GSK-3) and casein kinase 1α (CK1α). Therefore, in some embodiments the compositions of active agents for enhancing the Wnt signaling pathway in cancer cells include one or more inhibitors of Axin, adenomatosis polyposis coli (APC), protein phosphatase 2A (PP2A), glycogen synthase kinase 3 (GSK-3) and casein kinase 1α (CK1α). In a preferred embodiment, the active agents for enhancing the Wnt signaling pathway in cancer cells include one or more inhibitors of glycogen synthase kinase 3 (GSK-3).

It has been established that increasing Wnt signaling activity in cancer cells characterized by abnormally high levels of Wnt activity and/or reduced APC function gives rise to inhibition of cancer cell proliferation. Excessive Wnt activity beyond a threshold value in cancer cells results in diminished cancer cell proliferation and reduction in tumor burden. In a preferred embodiment, the active agent increasing Wnt activity is an agent that reduces the levels or activity of one or more inhibitors of the Wnt signaling pathway.

One agent that enhances Wnt activity is an inhibitor of APC-mediated activities, such as an inhibitor of GSK-3. Therefore, in some embodiments, compositions and methods of one or more GSK-3 inhibitors increase Wnt activity beyond a threshold value in cancer cells characterized by increased Wnt activity, to treat cancer in a subject.

Compositions of active agents for enhancing the Wnt signaling pathway in cancer cells include one or more active agents that enhance Wnt signaling. In some embodiments, the active agent is a protein, nucleic acid, nucleic acid analog, carbohydrate, or small molecule suitable for enhancing the Wnt signaling pathway. In preferred embodiments, the active agent is a protein, nucleic acid, nucleic acid analog, carbohydrate, or small molecule suitable for enhancing Wnt signaling pathway, preferably by inhibiting glycogen synthase kinase 3 (GSK-3).

1. Glycogen Synthase Kinase 3 Inhibitors

In some embodiments, the active agent is an inhibitor of Glycogen synthase kinase 3 (GSK-3). In a preferred embodiment, the GSK-3 inhibitor is the small molecule inhibitor LY2090314.

Typically, the GSK-3 inhibitor e.g., LY2090314, is administered to cancer cells in a subject in amount effective to reduce or inhibit GSK-3 activity in the cancer cells of the subject. For example, in some embodiments, the LY2090314 is administered in amount effective to treat or prevent one or more symptoms of cancer in the subject. Due to the short serum half-life of LY2090314, the efficacy of LY2090314 for treating and preventing cancer in a subject is increased by one or more shielding agents or delivery systems that protect the LY2090314 molecule in the body of the subject. A preferred delivery system is a nanoparticle encapsulating, complexed with, or otherwise associated with one or more GSK-3 inhibitors, e.g., LY2090314. GSK-3 is a ubiquitously expressed serine/threonine kinase. It plays a fundamental role in many metabolic processes, especially as the final enzyme involved in glycogen synthesis. There are two major known isoforms of GSK-3, known as GSK-3α and GSK-3β. Unless otherwise specified, inhibitors of GSK-3 as described herein inhibit GSK-3α and GSK-3β. Therefore, in preferred embodiments, inhibitors of GSK-3 inhibit GSK-3α and GSK-3β. In other embodiments, the inhibitor is an inhibitor of GSK-3α, which inhibits the GSK-3α isoform, but has little or no activity on the GSK-3β isoform. In other embodiments, the inhibitor is an inhibitor of GSK-3β, which inhibits the GSK-3β isoform, but has little or no activity on the GSK-3α isoform.

The expression of GSK-3 is ubiquitous, and different concentrations of its isoform occur in human tissues, with important roles in many cellular pathways, including, PI3K/PTEN/Akt/mTORC1, and Ras/Raf/MEK/ERK. GSK-3 is constitutively active in human cells, under normal conditions, and phosphorylation at S9 and Y216 regulate GSK-3 activity. Given its broad function, when dysregulated GSK-3 has been linked to the development of several human diseases, including diabetes, bipolar disorder, neurodegenerative (Alzheimer's), and cardiovascular disease. Therefore, in preferred embodiments, inhibitors of GSK are in an amount effective to treat or prevent cancer in a subject, without inducing toxicity in the subject.

GSK-3 also plays an important role in the Wnt and Hedgehog (HH) pathways, involved in cell survival and morphology. GSK-3 affects tumorigenesis and progression of a variety of human cancers, in part through the Wnt and HH pathways and has been linked to development of melanoma, hepatocellular carcinoma, ovarian, prostate, pancreatic, and colorectal cancers (Takahashi-Yanaga F et al., Biochem. Pharmacol., 86 (2013), pp. 191-199; Cervello, M. et al., Adv. Biol. Regul., 65 (2017), pp. 59-76).

APC

In some embodiments, the GSK-3 inhibitor mediates the activity of the APC gene product. Up to seventy percent of colon cancers contain a mutation in the APC gene. APC is a key regulator of Wnt signaling. Activation of this pathway leads to nuclear accumulation of β-catenin, a process mediated by GSK-3 inhibition. Nuclear β-catenin interacts with T-cell factor 4 to induce transcription of VEGF and c-myc. Phosphorylation of β-catenin by GSK-3 targets it for degradation (Vidri, et al., Biochimica et Biophysica Acta (BBA)—Molecular Cell Research, V 1867, (4), 118626, (2020), ISSN 0167-4889; Kwong, et al., Advances in experimental medicine and biology, V656 85-106. (2009) doi: 10.1007/978-1-4419-1145-2_8; and Mancinelli, et al., Oxidative Medicine and Cellular Longevity, V. 2017, Article ID 4629495, doi.org/10.1155/2017/4629495).

In some embodiments, the active agent is a small molecule that is capable of inhibiting GSK-3. The term "small molecule" refers to small organic compounds having a molecular weight of more than about 100 Daltons (Da) and less than about 2,500 Da, preferably between about 100 Da and about 2,000 Da inclusive, more preferably between about 100 Da and about 1,250 Da inclusive, more preferably between about 100 Da and about 1,000 Da inclusive, more preferably between about 100 Da and about 750 Da inclusive, more preferably between about 200 Da and about 600 Daltons, inclusive.

i. LY2090314

In some embodiments, the GSK3αβ Inhibitor is LY2090314, having a molecular structure as shown in Formula I, below.

LY2090314 (CAS #603288-22-8) is a small molecule with a molecular weight of 512.53 Da, and Formula $C_{28}H_{25}FN_6O_3$, having solubility of 31 mg/mL (60.48 mM) in DMSO. LY2090314 is a potent inhibitor of glycogen synthase kinase-3 (GSK-3), with IC50 values of 1.5 nM and 0.9 nM for GSK-3α and GSK-3β, respectively. LY2090314 (20 nM) promotes a time-dependent stabilization of β-catenin total protein as well as an induction of Axin2. LY2090314 is highly selective towards GSK3 as demonstrated by its fold selectivity relative to a large panel of kinases. LY2090314 potently induces apoptotic cell death in a panel of melanoma cell lines irrespective of BRAF mutation status. Cell death induced by LY2090314 is dependent on β-catenin and GSK3β knockdown increases the sensitivity of cells to LY2090314. LY2090314 remains active in cell lines resistant to PLX4032 and has an independent mechanism of action. LY2090314 exhibits high clearance (approximating hepatic blood flow) and a moderate volume of distribution (approximately 1-2 L/kg) resulting in rapid elimination (half-life approximately 0.4, 0.7, and 1.8-3.4 hours in rats, dogs, and humans, respectively). LY2090314 is rapidly cleared by extensive metabolism with negligible circulating metabolite exposures due to biliary excretion of metabolites into feces with no apparent intestinal reabsorption (Zamek-Gliszczynski, et al., Drug Metab Dispos, 2013 April; 41(4):714-26. doi: 10.1124/dmd.112.048488. Epub 2013 Jan. 10). LY2090314 (25 mg/kg Q3D, i.v.) elevates Axin2 gene expression in vivo, demonstrates single agent activity in the A375 xenograft model of melanoma and enhances the efficacy of DTIC.

LY2090314 is available from multiple commercial sources, including MedChem Express, Catalogue No. HY-16294.

ii. Other Small Molecule GSK-3 Inhibitors

In some embodiments, the inhibitor of GSK-3 is another small molecule drug that inhibits the activity of GSK-3. Exemplary small molecule GSK-3 inhibitors include CHIR-99021, SB 216763, Tideglusib, TWS119, AR-A014418, TDZD-8, GSK 3 Inhibitor IX, Kenpaullone, Cromolyn sodium, CHIR-98014, AZD1080, R547, RGB-286638, 9-ING-41, SB 415286, BRD0705, IM-12, AZD2858, Indirubin-3'-monoxime, 1-Azakenpaullone, CP21R7, Bikinin, BIO-acetoxime, VP3.15 dihydrobromide, GNF4877, GSK-30 inhibitor 1, and hSMG-1 inhibitor 11j.

In some embodiments, the GSK-3 inhibitor is the small molecule inhibitor SAR502250 as shown in Formula II.

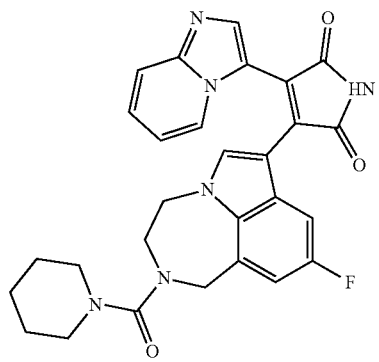

Formula I

LY2090314

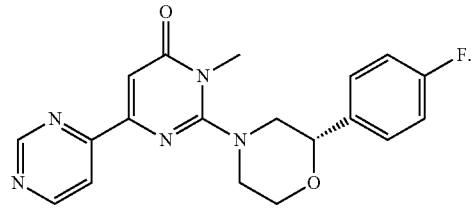

Formula II

SAR502250

In other embodiments, the GSK-3 inhibitor is the small molecule inhibitor AZD2858 as shown in Formula III.

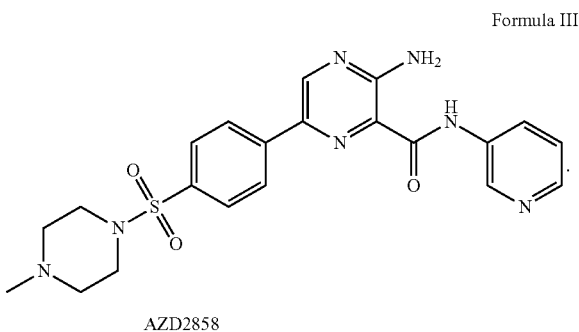 [SMILES: CN1CCN(S(=O)(=O)c2ccc(-c3cnc(N)c(C(=O)Nc4cccnc4)n3)cc2)CC1]

Formula III

AZD2858

2. Wnt3a Protein

In some embodiments, the one or more active agent is an isolated Wnt3a protein (Wingless type MMTV integration site family member 3A). Wnt3a is a member of the Wnt family of gene products, which activates the canonical Wnt signaling pathway to exhibit multiple biological functions. Wnt3a is associated with embryonic development, neural development, cell differentiation, proliferation, and tumorigenesis. Wnt3a serves as a ligand for members of the frizzled family of seven transmembrane receptors. Wnt-3 and Wnt-3a play distinct roles in cell-cell signaling during morphogenesis of the developing neural tube. It has been established that exposure of cells to Wnt3a can enhance Wnt activity, for example, enhanced signaling via the Wnt signaling pathway.

An exemplary human Wnt 3a polypeptide has a molecular weight of about 60-70 kDa, including about 385 amino acids. In some embodiments, the isolated Wnt3a protein has an amino acid sequence set forth below:

(SEQ ID NO: 1)
MAPLGYFLLLCSLKQALGSYPIWWSLAVGPQYSSLGSQPILCASIPGLVP

KQLRFCRNYVEIMPSVAEGIKIGIQECQHQFRGRRWNCTTVHDSLAIFGP

VLDKATRESAFVHAIASAGVAFAVTRSCAEGTAAICGCSSRHQGSPGKG

WKWGGCSEDIEFGGMVSREFADARENRPDARSAMNRHNNEAGRQAIA

SHMHLKCKCHGLSGSCEVKTCWWSQPDFRAIGDFLKDKYDSASEMVV

EKHRESRGWVETLRPRYTYFKVPTERDLVYYEASPNFCEPNPETGSFGT

RDRTCNVSSHGIDGCDLLCCGRGHNARAERRREKCRCVFHWCCYVSCQ

ECTRVYDVHTCKNPGSRAGNSAHQPPHPQPPVRFHPPLRRAGKVP.

In some embodiments, an isolated Wnt3a protein is expressed recombinantly, optionally with one or more purification tags such as histidine tags.

In some embodiments, the isolated Wnt3a protein is co-expressed or fused to one or more additional components for increased yield, enhanced stability, ease of purification, etc. relative to isolated Wnt3a protein expressed alone. In one embodiment, the Wnt3a protein is fused to afamin (AFM) to allow purification of functional unmodified Wnt3a through the pulldown of the complexed protein AFM which was modified with a TEV (Tobacco echo Virus) moiety with a histidine tag (e.g., 6×HIS tag) for pulldown, having an amino acid sequence set forth below:

(SEQ ID NO: 2)
MAPLGYFLLLCSLKQALGSYPIWWSLAVGPQYSSLGSQPILCASIPGLVP

KQLRFCRNYVEIMPSVAEGIKIGIQECQHQFRGRRWNCTTVHDSLAIFGP

VLDKATRESAFVHAIASAGVAFAVTRSCAEGTAAICGCSSRHQGSPGKG

WKWGGCSEDIEFGGMVSREFADARENRPDARSAMNRHNNEAGRQAIA

SHMHLKCKCHGLSGSCEVKTCWWSQPDFRAIGDFLKDKYDSASEMVV

EKHRESRGWVETLRPRYTYFKVPTERDLVYYEASPNFCEPNPETGSFGT

RDRTCNVSSHGIDGCDLLCCGRGHNARAERRREKCRCVFHWCCYVSCQ

ECTRVYDVHTCKGSGEGRGSLLTCGDVEENPGPMKLLKLTGFIFFLFFLT

ESLTLPTQPRDIENFNSTQKFIEDNIEYITIIAFAQYVQEATFEEMEKLV

KDMVEYKDRCMADKTLPECSKLPNNVLQEKICAMEGLPQKHNFSHCCSKV

DAQRRLCFFYNKKSDVGFLPPFPTLDPEEKCQAYESNRESLLNHFLYEV

ARRNPFVFAPTLLTVAVHFEEVAKSCCEEQNKVNCLQTRAIPVTQYLKA

FSSYQKHVCGALLKFGTKVVHFIYIAILSQKFPKIEFKELISLVEDVSSN

YDGCCEGDVVQCIRDTSKVMNHICSKQDSISSKIKECCEKKIPERGQCII

NSNKDDRPKDLSLREGKFTDSENVCQERDADPDTFFAKFTFEYSRRHPDL

SIPELLRIVQIYKDLLRNCCNTENPPGCYRYAEDKFNETTEKSLKMVQQE

CKHFQNLGKDGLKYHYLIRLTKIAPQLSTEELVSLGEKMVTAFTTCCTLS

EEFACVDNLADLVFGELCGVNENRTINPAVDHCCKTNFAFRRPCFESLKA

DKTYVPPPFSQDLFTFHADMCQSQNEELQRKTDRFLVNLVKLKHELTDE

ELQSLFTNFANVVDKCCKAESPEVCFNEESPKIGNENLYFQGHHHHHH.

In another embodiment, the Wnt3a protein is directly tagged with a TEV (Tobacco echo Virus) moiety with a histidine tag (e.g., 6×HIS tag), having an amino acid sequence set forth below:

(SEQ ID NO: 3)
MAPLGYFLLLCSLKQALGSYPIWWSLAVGPQYSSLGSQPILCASIPGLVP

KQLRFCRNYVEIMPSVAEGIKIGIQECQHQFRGRRWNCTTVHDSLAIFGP

VLDKATRESAFVHAIASAGVAFAVTRSCAEGTAAICGCSSRHQGSPGKG

WKWGGCSEDIEFGGMVSREFADARENRPDARSAMNRHNNEAGRQAIA

SHMHLKCKCHGLSGSCEVKTCWWSQPDFRAIGDFLKDKYDSASEMVV

EKHRESRGWVETLRPRYTYFKVPTERDLVYYEASPNFCEPNPETGSFGT

RDRTCNVSSHGIDGCDLLCCGRGHNARAERRREKCRCVFHWCCYVSCQ

ECTRVYDVHTCKENLYFQGSGGGGSGGGGSGGGGSHHHHHH.

In some embodiments, the Wnt3a protein is isolated or purified using precipitation with polyethylene glycol. In preferred embodiments, the Wnt3a protein is precipitated with a high concentration of polyethylene glycol, for example, with a final PEG concentration of more than 40%, more than 30%, more than 25%, more than 20%, more than 15%, more than 10%, or more than 5%, or between about 40% and about 10%, inclusive; or between about 30% and about 20%, inclusive. In a specific embodiment, the Wnt3a protein conjugated to a TEV (Tobacco echo Virus) moiety with a histidine tag is precipitated with a high concentration of polyethylene glycol, for example, 30%, 25%, 20%, 15%, 10%, 5%. In some embodiments, the PEGs for protein precipitation is PEG400, PEG1500, PEG6000, PEG8000, PEG10,000, and/or PEG20,000.

Therefore, in some embodiments, one or more active agent is an isolated Wnt3a protein, such as a soluble polypeptide having an amino acid sequence of SEQ ID NO:1, or a variant thereof, having 50% or more sequence identity to SEQ ID NO:1, such as at least 55%, 60%, 65%, 70%, 75%, 80%, 85%, 90%, 95%, 96%, 97%, 98%, 99%, or at least 99.5% sequence identity to SEQ ID NO:1. Recombinant human Wnt3a Proteins are available from multiple commercial sources, including Abcam Catalogue No. ab153563.

In some embodiments, one or more active agent is an isolated Wnt3a protein and one or more of R-Spondin3 and Noggin. An exemplary R-Spondin 3 protein has an amino acid sequence set forth below:

(SEQ ID NO: 4)
MHLRLISWLFIILNFMEYIGSQNASRGRRQRRMHPNVSQGCQGGCATCS

DYNGCLSCKPRLFFALERIGMKQIGVCLSSCPSGYYGTRYPDINKCTKCK

ADCDTCFNKNFCTKCKSGFYLHLGKCLDNCPEGLEANNHTMECVSIVH

CEVSEWNPWSPCTKKGKTCGFKRGTETRVREIIQHPSAKGNLCPPTNET

RKCTVQRKKCQKGERGKKGRERKRKKPNKGESKEAIPDSKSLESSKEIP

EQRENKQQQKKRKVQDKQKSVSVSTVHENLYFQGHHHHHH.

B. Nanoparticles and Microparticles

In some embodiments, compositions of active agents for enhancing the Wnt signaling pathway in cancer cells include one or more particles for delivery of active agents that enhance Wnt signaling into the body.

Appropriate delivery vehicles for the compounds are known in the art and can be selected to suit the particular active agent. For example, in some embodiments, the composition is incorporated into or encapsulated by, or bound to, a nanoparticle, microparticle, microsphere, micelle, synthetic lipoprotein particle, or carbon nanotube.

For example, the compositions can be incorporated into a vehicle such as polymeric microparticles or polymeric nanoparticles which provide controlled release of the active agent(s). In some embodiments, release of the drug(s) is controlled by diffusion of the active agent(s) out of the particles and/or degradation of the polymeric particles by hydrolysis and/or enzymatic degradation.

In preferred embodiments, the compositions are incorporated into polymeric microparticles or polymeric nanoparticles that provide controlled release of the active agent(s), reduce rapid clearance from the system, and/or reduce rapid liver metabolism of the active agent(s).

Generally, the particles are formed from one or more polymers, lipids, or other suitable materials which encapsulate, are complexed with, or are otherwise associated with the one or more GSK-3 inhibitors. The particles shield the GSK-3 inhibitors from degradation or destruction within the body and thereby enhance the serum half-life and residence time of the GSK-3 inhibitors. In some embodiments, the particles include one or more targeting agents, for example, to deliver the GSK-3 inhibitors to any targeted site, e.g., specific cell types, specific organelles.

The particles permit and/or enhance the biological activity of the encapsulated or associated active agents. Typically, the particles protect the active agents to effectively prolong the residence time of the active agents in vivo. Therefore, the particles effectively increase the serum half-life of the active agent(s) in vivo as compared to the half-life of the active agents in the absence of a particle. In some embodiments, the particles enhance the serum half-life of the active agents by 10%, 20%, 50%, 75%, 100%, 200%, 300%, 400% or more than the serum half-life of the active agents without association with or encapsulation within a delivery vehicle such as a particle. In certain embodiments, an encapsulated agent for enhancing Wnt signaling activity is cleared with a half-life of 2, 5, 10, 20, 50, 100, 200, 500, 1000, 2000, 5000, or 10000 times longer than a standard of comparison such as a comparable agent without a particle that specifically target specific cell types associated with tumors. The particles typically release the GSK-3 inhibitors into the body over a defined time course that is typically at least twice, three times, four times, five times, ten times or twenty times the half-life of the same amount of the same GSK-3 inhibitors in serum alone. In some embodiments, two active agents, with or without targeting moieties, are incorporated into the same particles and are formulated for release at different times and/or over different time periods. For example, in some embodiments, one of the agents is released entirely from the particles before release of the second agent begins. In other embodiments, release of the first agent begins followed by release of the second agent before all the first agent is released. In still other embodiments, both agents are released at the same time over the same period or over different periods of time.

1. Polymeric Nanoparticles

In some embodiments, the active agents are encapsulated within or complexed with a polymeric nanoparticle.

The particle can be a polymeric particle, a lipid particle, a solid lipid particle, an inorganic particle, or combinations thereof. For example, the particle can be a lipid-stabilized polymeric particle. In preferred embodiments the particle is a polymeric particle, a solid lipid particle, or a lipid-stabilized polymeric particle. The particle can include a polymeric particle formed from biodegradable polymers, non-biodegradable polymers, or a combination thereof. The polymeric particle core can be a biodegradable polymeric core in whole or in part.

FDA Approved Biodegradable Polymers

In some embodiments, the active agents are encapsulated within and/or complexed with a polyhydroxy acid ester such as poly(lactic-co-glycolic acid) (PLGA), poly(lactic acid) (PLA), or poly(glycolic acid) (PGA), to form a particle with nanometer dimensions. Poly(lactic-co-glycolic acid) (PLGA), or (PLG), is a copolymer which is used in many Food and Drug Administration (FDA) approved therapeutic devices, owing to its biodegradability and biocompatibility. During polymerization, successive monomeric units (of glycolic or lactic acid) are linked together in PLGA by ester linkages, thus yielding a linear, aliphatic polyester as a product.

Other FDA approved polymers include polyanhydrides, polyorthoesters, polyhydroxyalkanoates, and some non-biodegradable polymers such as polymethacrylate and cyanomethacrylate. Particle includes polyhydroxyalkanoates are particularly suited for delivering to areas along the gastrointestinal tract and/or for systemic delivery via absorption through gastrointestinal tract follow enteral administration. In preferred embodiments, the particle includes polyhydroxyalkanoates.

In some embodiments, the particle includes the biodegradable polymer blended with, or covalently bound to one or more additional polymers. The additional polymers can be present within the inner core and/or outer surface of the particle upon formation, for example, blended with PLGA, or attached exclusively to the outside of the particle.

Polyalkylene oxide (PEO) polymers (also referred to as polyalkylenes, polyalkylene glycols, or polyalkylene oxides), are frequently bound to the surface of the polymers, or covalently bound to a hydrophobic biodegradable polymers, which self-assemble to form particles having the PEO polymers on the surface and the hydrophobic polymer in the core. A preferred PEO is polyethyleneglycol (PEG).

Other Biodegradable Polymers

In some embodiments the active agents are encapsulated within and/or complexed with biodegradable polymers. Exemplary biodegradable polymers include polymers that are insoluble or sparingly soluble in water that are converted chemically or enzymatically in the body into water-soluble materials. Biodegradable polymers can include soluble polymers crosslinked by hydrolyzable cross-linking groups to render the crosslinked polymer insoluble or sparingly soluble in water. Representative biodegradable polymers include polyamides, polycarbonates, polyalkylene terepthalates, polyvinyl alcohols, polyvinyl ethers, polyvinyl esters, polyvinyl halides, polyvinylpyrrolidone, polyglycolides, polysiloxanes, polyurethanes and copolymers thereof, modified celluloses, and acrylate polymers.

Excipients may also be added to the core polymer to alter its porosity, permeability, and or degradation profile.

Hydrophilic Polymers

In some embodiments the active agents are encapsulated within and/or complexed with one or more hydrophilic polymers. Representative hydrophilic polymers include cellulosic polymers such as starch and polysaccharides; hydrophilic polypeptides and poly(amino acids) such as poly-L-glutamic acid (PGS), gamma-polyglutamic acid, poly-L-aspartic acid, poly-L-serine, or poly-L-lysine; polyalkylene glycols and polyalkylene oxides such as polyethylene glycol (PEG), polypropylene glycol (PPG), and poly(ethylene oxide) (PEO); poly(oxyethylated polyol); poly(olefinic alcohol); polyvinylpyrrolidone); poly(hydroxyalkylmethacrylamide); poly(hydroxyalkylmethacrylate); poly(saccharides); poly(hydroxy acids); poly(vinyl alcohol), and copolymers thereof.

Hydrophobic Polymers

Representative hydrophobic polymers include polyhydroxyacids such as poly(lactic acid), poly(glycolic acid), and poly(lactic acid-co-glycolic acids); polyhydroxyalkanoates such as poly3-hydroxybutyrate or poly4-hydroxybutyrate; polycaprolactones; poly(orthoesters); polyanhydrides; poly (phosphazenes); poly(lactide-co-caprolactones); polycarbonates such as tyrosine polycarbonates; polyamides (including synthetic and natural polyamides), polypeptides, and poly(amino acids); polyesteramides; polyesters; poly (dioxanones); poly(alkylene alkylates); hydrophobic polyethers; polyurethanes; polyetheresters; polyacetals; polycyanoacrylates; polyacrylates; polymethylmethacrylates; polysiloxanes; poly(oxyethylene)/poly(oxypropylene) copolymers; polyketals; polyphosphates; polyhydroxyvalerates; polyalkylene oxalates; polyalkylene succinates; poly (maleic acids), as well as copolymers thereof.

Amphiphilic Polymers

Representative amphiphilic polymers include block copolymers of any of the hydrophobic and hydrophilic polymers described above. Amphiphilic compounds also include phospholipids, such as 1,2 distearoyl-sn-glycero-3-phosphoethanolamine (DSPE), dipalmitoylphosphatidylcholine (DPPC), distearoylphosphatidylcholine (DSPC), diarachidoylphosphatidylcholine (DAPC), dibehenoylphosphatidylcholine (DBPC), ditricosanoylphosphatidylcholine (DTPC), and dilignoceroylphatidylcholine (DLPC), incorporated at a ratio of between 0.01-60 (weight lipid/w polymer), most preferably between 0.1-30 (weight lipid/w polymer).

PEGylation

As noted above, modification of the surface of the particles to increase available hydroxyl groups, typically by incorporation into or onto the surface PEO polymers, can be used to decrease clearance rates from the blood and to enhance cellular or tissue uptake. Methods for surface modification of the polymeric particles, or incorporation of PEO polymers are known to those skilled in the art.

2. Lipidic Particles

In some embodiments, the particle is a lipid particle, liposome or micelle, or includes a lipid core. Lipid particles and lipid nanoparticles are known in the art. Lipid particles are formed from one or more lipids, which can be neutral, anionic, or cationic at physiologic pH. The lipid particle is preferably made from one or more biocompatible lipids. The lipid particles may be formed from a combination of more than one lipid, for example, a charged lipid may be combined with a lipid that is non-ionic or uncharged at physiological pH.

Representative neutral and anionic lipids include, but are not limited to, sterols and lipids such as cholesterol, phospholipids, lysolipids, lysophospholipids, sphingolipids or pegylated lipids. Neutral and anionic lipids include, but are not limited to, phosphatidylcholine (PC) (such as egg PC, soy PC), including 1,2-diacyl-glycero-3-phosphocholines; phosphatidylserine (PS), phosphatidylglycerol, phosphatidylinositol (PI); glycolipids; sphingophospholipids such as sphingomyelin and sphingoglycolipids (also known as 1-ceramidyl glucosides) such as ceramide galactopyranoside, gangliosides and cerebrosides; fatty acids, sterols, containing a carboxylic acid group for example, cholesterol.

Representative cationic lipids include, but are not limited to, N-[1-(2,3-dioleoyloxy)propyl]-N,N,N-trimethyl ammonium salts, referred to as TAP lipids, for example, methylsulfate salt. Representative TAP lipids include, but are not limited to, DOTAP (dioleoyl-), DMTAP (dimyristoyl-), DPTAP (dipalmitoyl-), and DSTAP (distearoyl-). Representative cationic lipids in the liposomes include, but are not limited to, dimethyldioctadecyl ammonium bromide (DDAB), 1,2-diacyloxy-3-trimethylammonium propanes, N-[1-(2,3-dioloyloxy)propyl]-N,N-dimethyl amine (DODAP), 1,2-diacyloxy-3-dimethylammonium propanes, N-[1-(2,3-dioleyloxy)propyl]-N,N,N-trimethylammonium chloride (DOTMA), 1,2-dialkyloxy-3-dimethylammonium propanes, dioctadecylamidoglycylspermine (DOGS), 3-[N-(N',N'-dimethylamino-ethane)carbamoyl]cholesterol (DC-Chol); 2,3-dioleoyloxy-N-(2-(sperminecarboxamido)-ethyl)-N,N-dimethyl-1-propanaminium trifluoro-acetate (DOSPA), β-alanyl cholesterol, cetyl trimethyl ammonium bromide (CTAB), diC$_{14}$-amidine, N-ferf-butyl-N'-tetradecyl-3-tetradecylamino-propionamidine, N-(alpha-trimethylammonioacetyl)didodecyl-D-glutamate chloride (TMAG), ditetradecanoyl-N-(trimethylammonio-acetyl)diethanolamine chloride, 1,3-dioleoyloxy-2-(6-carboxy-spermyl)-propylamide (DOSPER), and N, N, N', N'-tetramethyl-, N'-bis(2-hydroxyethyl)-2,3-dioleoyloxy-1,4-butanediammonium iodide. In one embodiment, the cationic lipids can be 1-[2-(acyloxy)ethyl]2-alkyl(alkenyl)-3-(2-hydroxyethyl)-imidazolinium chloride derivatives, for example, 1-[2-(9(Z)-octadecenoyloxy)ethyl]-2-(8(Z)-heptadecenyl-3-(2-hydroxyethyl)imidazolinium chloride (DOTIM), and 1-[2-(hexadecanoyloxy)ethyl]-2-pentadecyl-3-(2-hydroxyethyl)imidazolinium chloride (DPTIM). In one embodiment, the cationic lipids can be 2,3-dialkyloxypropyl quaternary ammonium compound derivatives containing a hydroxyalkyl moiety on the quaternary amine, for example, 1,2-dioleoyl-3-dimethyl-hydroxyethyl ammonium bromide (DORI), 1,2-dioleyloxypropyl-3-dimethyl-hydroxyethyl ammonium bromide (DORIE), 1,2-dioleyloxypropyl-3-dimethyl-hydroxypropyl ammonium bromide (DORIE-HP), 1,2-dioleyl-oxy-propyl-3-dimethyl-hydroxybutyl ammonium bromide (DORIE-HB), 1,2-dioleyloxypropyl-3-dimethyl-hydroxypentyl ammonium bromide (DORIE-Hpe), 1,2-dimyristyloxypropyl-3-dimethyl-hydroxylethyl ammonium bromide (DMRIE), 1,2-dipalmityloxypropyl-3-dimethyl-hydroxyethyl ammonium bromide (DPRIE), and 1,2-disteryloxypropyl-3-dimethyl-hydroxyethyl ammonium bromide (DSRIE).

Micelles

In some embodiments, the particle or particle core is a lipid micelle. Lipid micelles can be formed, for instance, as a water-in-oil emulsion with a lipid surfactant. An emulsion is a blend of two immiscible phases wherein a surfactant is added to stabilize the dispersed droplets. In some embodiments the lipid micelle is a microemulsion. A microemulsion is a thermodynamically stable system composed of at least water, oil and a lipid surfactant producing a transparent and thermodynamically stable system whose droplet size is less than 1 micron, from about 10 nm to about 500 nm, or from about 10 nm to about 250 nm. Lipid micelles are generally useful for encapsulating hydrophobic active agents, including hydrophobic therapeutic agents, hydrophobic prophylactic agents, or hydrophobic diagnostic agents.

Liposomes

In some embodiments, the particle or particle core is a liposome. Liposomes are small vesicles composed of an aqueous medium surrounded by lipids arranged in spherical bilayers. Liposomes can be classified as small unilamellar vesicles, large unilamellar vesicles, or multi-lamellar vesicles. Multi-lamellar liposomes contain multiple concentric lipid bilayers. Liposomes can be used to encapsulate targeted agents, by trapping hydrophilic agents in the aqueous interior or between bilayers, or by trapping hydrophobic agents within the bilayer.

The lipid micelles and liposomes typically have an aqueous center. The aqueous center can contain water or a mixture of water and alcohol. Representative alcohols include, but are not limited to, methanol, ethanol, propanol, (such as isopropanol), butanol (such as n-butanol, isobutanol, sec-butanol, tert-butanol, pentanol (such as amyl alcohol, isobutyl carbinol), hexanol (such as 1-hexanol, 2-hexanol, 3-hexanol), heptanol (such as 1-heptanol, 2-heptanol, 3-heptanol and 4-heptanol) or octanol (such as 1-octanol) or a combination thereof.

In one embodiment, liposomes are prepared from long chain fatty acids and phytosterol formulations.

Solid Lipid Particles

In some embodiments, the particle is a solid lipid particle, or includes a solid lipid core. Solid lipid particles present an alternative to the colloidal micelles and liposomes. Solid lipid particles are typically submicron in size, i.e., from about 10 nm to about 1 micron, from 10 nm to about 500 nm, or from 10 nm to about 250 nm. Solid lipid particles are formed of lipids that are solids at room temperature. They are derived from oil-in-water emulsions, by replacing the liquid oil by a solid lipid.

Representative solid lipids include, but are not limited to, higher saturated alcohols, higher fatty acids, sphingolipids, synthetic esters, and mono-, di-, and triglycerides of higher saturated fatty acids. Solid lipids can include aliphatic alcohols having 10-40, preferably 12-30 carbon atoms, such as cetostearyl alcohol. Solid lipids can include higher fatty acids of 10-40, preferably 12-30 carbon atoms, such as stearic acid, palmitic acid, decanoic acid, and behenic acid. Solid lipids can include glycerides, including monoglycerides, diglycerides, and triglycerides, of higher saturated fatty acids having 10-40, preferably 12-30 carbon atoms, such as glyceryl monostearate, glycerol behenate, glycerol palmitostearate, glycerol trilaurate, tricaprin, trilaurin, trimyristin, tripalmitin, tristearin, and hydrogenated castor oil. Representative solid lipids can include cetyl palmitate or beeswax. Cyclodextrin can also be used.

3. Inorganic Particles

In some embodiments, the particle is formed from, or includes a core formed from an inorganic particle such as metal, metal oxide or semiconductor particles. The particle can be a metal nanoparticle, a semiconductor nanoparticle, or a core-shell nanoparticle. Inorganic particles and inorganic nanoparticles can be formulated into a variety of shapes such as rods, shells, spheres, and cones. The inorganic particle may have any dimension. The inorganic particle can have a greatest dimension less than 1 micron, from about 10 nm to about 1 micron, from about 10 nm to about 500 nm, or from 10 nm to about 250 nm.

The inorganic particle or particle core can contain a metal oxide. Metal oxides of any of the above metals are contemplated. Suitable metal oxides can include metal oxides that contain one or more of the following metals: titanium, scandium, iron, tantalum, cobalt, chromium, manganese, platinum, iridium, niobium, vanadium, zirconium, tungsten, rhodium, ruthenium, copper, zinc, yttrium, molybdenum, technetium, palladium, cadmium, hafnium, rhenium and combinations thereof. Suitable metal oxides can include cerium oxides, platinum oxides, yttrium oxides, tantalum oxides, titanium oxides, zinc oxides, iron oxides, magnesium oxides, aluminum oxides, iridium oxides, niobium oxides, zirconium oxides, tungsten oxides, rhodium oxides, ruthenium oxides, alumina, zirconia, silicone oxides such as silica-based glasses and silicon dioxide, or combinations thereof. The metal oxide can be non-biodegradable. The metal oxide can be a biodegradable metal oxide. Biodegradable metal oxides can include silicon oxide, aluminum oxide and zinc oxide.

Hybrid Particles

In some embodiments, the particle or particle core is a hybrid particle. Hybrid particle, as used herein, refers to a particle that combines the features of two or more of polymeric particles, lipid particles, and inorganic particles. Examples of hybrid particles can include polymer-stabilized liposomes, polymer-coated inorganic particles, or lipid-coated polymeric particles. The hybrid particle can contain a polymeric inner region, a lipid inner region, or an inorganic inner region. The hybrid particle can contain a polymer outer layer, a lipid outer layer, or an inorganic outer layer.

4. Dendrimeric Particles

In some embodiments, the particle or particle core is a dendrimer. Dendrimers are three-dimensional, hyper-branched, monodispersed, globular and polyvalent macromolecules comprising a high density of surface end groups. The term "dendrimer" includes, but is not limited to, a molecular architecture with an interior core and layers (or "generations") of repeating units which are attached to and extend from this interior core, each layer having one or more branching points, and an exterior surface of terminal groups attached to the outermost generation. In some embodiments, dendrimers have regular dendrimeric or "starburst" molecular structures.

Suitable dendrimers scaffolds that can be used include poly(amidoamine), also known as PAMAM, or STARBURST™ dendrimers; polypropylamine (POPAM), polyethylenimine, polylysine, polyester, iptycene, aliphatic poly (ether), and/or aromatic polyether dendrimers. The dendrimers can have carboxylic, amine and/or hydroxyl terminations. In preferred embodiments, the dendrimers have hydroxyl terminations. Each dendrimer of the dendrimer complex may be same or of similar or different chemical nature than the other dendrimers (e.g., the first dendrimer may include a PAMAM dendrimer, while the second dendrimer may be a POPAM dendrimer).

Generally, dendrimers have a diameter between about 1 nm and about 50 nm, more preferably between about 1 nm and about 20 nm, between about 1 nm and about 10 nm, or between about 1 nm and about 5 nm. In some embodiments, the diameter is between about 1 nm and about 2 nm. Conjugates are generally in the same size range, although large proteins such as antibodies may increase the size by 5-15 nm. In general, agent is conjugated in a mass ratio of agent to dendrimer of between 0.1:1 and 4:1, inclusive.

In some embodiments, dendrimers have a molecular weight between about 500 Daltons and about 100,000 Daltons, preferably between about 500 Daltons and about 50,000 Daltons, most preferably between about 1,000 Daltons and about 20,000 Dalton.

Methods for making dendrimers are known to those of skill in the art and generally involve a two-step iterative reaction sequence that produces concentric shells (generations) of dendritic β-alanine units around a central initiator core (e.g., ethylenediamine-cores). Each subsequent growth step represents a new "generation" of polymer with a larger molecular diameter, twice the number of reactive surface sites, and approximately double the molecular weight of the preceding generation. Dendrimer scaffolds suitable for use are commercially available in a variety of generations. Preferable, the dendrimer compositions are based on generation 0, 1, 2, 3, 4, 5, 6, 7, 8, 9, or 10 dendrimeric scaffolds. Such scaffolds have, respectively, 4, 8, 16, 32, 64, 128, 256, 512, 1024, 2048, and 4096 reactive sites. Thus, the dendrimeric compounds based on these scaffolds can have up to the corresponding number of combined targeting moieties, if any, and agents.

5. Targeting or Binding Moieties

In some embodiments, the particles include one or more tissue targeting or tissue binding moieties, for targeting the nanoparticle to a specific location in vivo, and/or for enhancing the in vivo residence time at a desired location within the body. For example, in some embodiments, the particle is sequestered or bound to one or more distinct tissues or organs following local or systemic administration into the body. Therefore, the presence of a targeting or binding moiety can enhance the delivery of an active agent to a target site relative to the nanoparticle and active agent in the absence of a targeting or binding moiety. Conjugation of the nanoparticle to one or more targeting or binding moieties can be via a spacer, and the linkage between the spacer and nanoparticle, and/or the spacer and targeting agent can be designed to provide releasable or non-releasable forms of the nanoparticle-targeting agent complex.

In some embodiments, the particles have prolonged residence along the gastrointestinal tract following enteral administration.

6. Particle Properties

The particles for delivery of active agents enhancing Wnt signaling have properties optimized for the penetration of cells, delivery of agents to tissues and for certain routes of administration. The particle can have a diameter of between about 10 nm and about 100,000 nm, inclusive. For example, nanoparticle can have a diameter from 10 nm to 900 nm, from 10 nm to 800 nm, from 10 nm to 700 nm, from 10 nm to 600 nm, from 10 nm to 500 nm, from 20 nm from 500 nm, from 30 nm to 500 nm, from 40 nm to 500 nm, from 50 nm to 500 nm, from 60 nm to 400 nm, from 50 nm to 350 nm, from 50 nm to 300 nm, or from 50 nm to 200 nm. In preferred embodiments, the nanoparticles can have a diameter less than 500 nm, less than 400 nm, less than 300 nm, or less than 200 nm. In some embodiments, microparticle can have a diameter of between about 1 micron and about 100 microns, inclusive, between about 1 micron and 20 micron, inclusive and between about 2 micron and 10 micron, inclusive.

In some embodiments, nanoparticles encapsulating one or more active agents for enhancing Wnt signaling have any diameter inclusive, between about 10 nm and about 500 nm, inclusive, between about 20 nm and about 500 nm, inclusive, or between about 25 nm and about 250 nm, inclusive. In preferred embodiments the particle core is a nanoparticle core having a diameter between about 25 nm and about 250 nm, inclusive. In the most preferred embodiment, the particles have a diameter between 10 nm and 150 nm, inclusive.

One embodiment provides nanoparticles that are engineered to maximize half-life and targeting of the nanoparticles to tumor microenvironment, and/or tumor vasculature, for example, by adjusting the amount of one or more compounds present at the surface of, or otherwise associated with the particles. In one embodiment, nanoparticles are engineered to maximize half-life and targeting of the nanoparticles to tumor microenvironment, and/or tumor vasculature by adjusting the amount of PEG on the nanoparticles.

C. Additional Active Agents to be Delivered

The compositions of nanoparticles or microparticles can be used to deliver active agents to enhance Wnt signaling and one or more additional active agents, particularly one or more active agents to prevent or treat one or more symptoms of cancer. Suitable therapeutic, diagnostic, and/or prophylactic agents can be a biomolecule, such as an enzyme, protein, polypeptide, or nucleic acid or a small molecule agent (e.g., molecular weight less than 2000 amu, preferably less than 1500 amu), including organic, inorganic, and organometallic agents.

1. Therapeutic Agents

In some embodiments, the one or more additional therapeutic, prophylactic, or prognostic agents include, but are not limited to, chemotherapeutic agents, anti-infectious agents, and combinations thereof.

For example, in some embodiments, the nanoparticles deliver LY2090314 and/or one or more GSK-3 inhibitors including CHIR-99021, SB 216763, Tideglusib, TWS119, AR-A014418, TDZD-8, GSK-3 Inhibitor IX, Kenpaullone, Cromolyn sodium, CHIR-98014, AZD1080, R547, RGB-286638, 9-ING-41, SB 415286, BRD0705, IM-12, AZD2858, Indirubin-3'-monoxime, 1-Azakenpaullone, CP21R7, Bikinin, BIO-acetoxime, VP3.15 dihydrobromide, GNF4877, GSK-3β inhibitor 1, and hSMG-1 inhibitor 11j, and/or isolated Wnt3a protein and optionally one or more additional therapeutic agent.

In some embodiments, the additional therapeutic agents are any inhibitors targeting one or more of APC, GSK-3alpha, GSK-3beta, or one or more components of the Wnt signaling pathway. In other embodiments, the additional therapeutic agents are inhibitors such as crizotinib, ceritinib, alectinib, brigatinib, bosutinib, dasatinib, imatinib, nilotinib, vemurafenib, dabrafenib, ibrutinib, palbociclib, sorafenib, ribociclib, cabozantinib, gefitinib, erlotinib, lapatinib, vandetanib, afatinib, osimertinib, ruxolitinib, tofacitinib, trametinib, axitinib, lenvatinib, nintedanib, pazopanib, regorafenib, sunitinib, vandetanib, dacomitinib, and ponatinib.

In some embodiments, the additional therapeutic agents are tyrosine kinase inhibitors such as HER2 inhibitors, EGFR tyrosine kinase inhibitors. Exemplary EGFR tyrosine kinase inhibitors include gefitinib, erlotinib, afatinib, dacomitinib, and osimertinib.

In some embodiments, the additional therapeutic agents are anti-angiogenesis agents. Representative anti-angiogenesis agents include, but are not limited to, antibodies to vascular endothelial growth factor (VEGF) such as bevacizumab (AVASTIN®) and rhuFAb V2 (ranibizumab, LUCENTIS®), and other anti-VEGF compounds including aflibercept (EYLEA®); MACUGEN® (pegaptanim sodium, anti-VEGF aptamer or EYE001) (Eyetech Pharmaceuticals); pigment epithelium derived factor(s) (PEDF); COX-2 inhibitors such as celecoxib (CELEBREX®) and rofecoxib (VIOXX®); interferon alpha; interleukin-12 (IL-12); thalidomide (THALOMID®) and derivatives thereof such as lenalidomide (REVLIMID®); squalamine; endostatin; angiostatin; ribozyme inhibitors such as ANGIOZYME® (Sirna Therapeutics); multifunctional anti-angiogenic agents such as NEOVASTAT® (AE-941) (Aeterna Laboratories, Quebec City, Canada); receptor tyrosine kinase (RTK) inhibitors such as sunitinib (SUTENT®); tyrosine kinase inhibitors such as sorafenib (Nexavar®) and erlotinib (Tarceva®); antibodies to the epidermal grown factor receptor such as panitumumab (VECTIBIX®) and cetuximab (ERBITUX®), as well as other anti-angiogenesis agents known in the art.

In some embodiments, one or more additional therapeutic agents include conventional cancer therapeutics such as chemotherapeutic agents, cytokines, chemokines, and radiation therapy. The majority of chemotherapeutic drugs can be divided into alkylating agents, antimetabolites, anthracyclines, plant alkaloids, topoisomerase inhibitors, and other antitumor agents. These drugs affect cell division or DNA synthesis and function in some way. Additional therapeutics include monoclonal antibodies and the tyrosine kinase inhibitors e.g., imatinib mesylate (GLEEVEC® or GLIVEC®), which directly targets a molecular abnormality in certain types of cancer (chronic myelogenous leukemia, gastrointestinal stromal tumors).

Representative chemotherapeutic agents that can be encapsulated or mixed with one or more active agents enhancing Wnt signaling include, but are not limited to, amsacrine, bleomycin, busulfan, camptothecin, capecitabine, carboplatin, carmustine, chlorambucil, cisplatin, cladribine, clofarabine, crisantaspase, cyclophosphamide, cytarabine, dacarbazine, dactinomycin, daunorubicin, docetaxel, doxorubicin, epipodophyllotoxins, epirubicin, etoposide, etoposide phosphate, fludarabine, fluorouracil, gemcitabine, hydroxycarb amide, idarubicin, ifosfamide, innotecan, leucovorin, liposomal doxorubicin, liposomal daunorubici, lomustine, mechlorethamine, melphalan, mercaptopurine, mesna, methotrexate, mitomycin, mitoxantrone, oxaliplatin, paclitaxel, pemetrexed, pentostatin, procarbazine, raltitrexed, satraplatin, streptozocin, teniposide, tegafur-uracil, temozolomide, teniposide, thiotepa, tioguanine, topotecan, treosulfan, vinblastine, vincristine, vindesine, vinorelbine, vorinostat, taxol, trichostatin A and derivatives thereof, trastuzumab (HERCEPTIN®), cetuximab, and rituximab (RITUXAN® or MABTHERA®), bevacizumab (AVASTIN®), and combinations thereof. Representative pro-apoptotic agents include, but are not limited to, fludarabinetaurosporine, cycloheximide, actinomycin D, lactosylceramide, 15d-PGJ(2)5 and combinations thereof.

In some embodiments, the compositions and methods are used prior to or in conjunction with an immunotherapy such inhibition of checkpoint proteins such as components of the PD-1/PD-L1/2 axis or CD28-CTLA-4 axis using one or more immune checkpoint modulators (e.g., PD-1 antagonists, PD-1 ligand antagonists, and CTLA4 antagonists), adoptive T cell therapy, and/or a cancer vaccine. Exemplary immune checkpoint modulators used in immunotherapy include pembrolizumab (anti-PD1 mAb), durvalumab (anti-PDL1 mAb), PDR001 (anti-PD1 mAb), atezolizumab (anti-PDL1 mAb), nivolumab (anti-PD1 mAb), tremelimumab (anti-CTLA4 mAb), avelumab (anti-PDL1 mAb), and RG7876 (CD40 agonist mAb). In some embodiments, the compositions and methods are used prior to or in conjunction with anti-PDL2 mAb.

In some embodiments, the additional therapeutic agent is an anti-infectious agent. Exemplary anti-infectious agents include antiviral agents, antibacterial agents, antiparasitic agents, and anti-fungal agents. Exemplary antibiotics include moxifloxacin, ciprofloxacin, erythromycin, levofloxacin, cefazolin, vancomycin, tigecycline, gentamycin, tobramycin, ceftazidime, ofloxacin, gatifloxacin; antifungals: amphotericin, voriconazole, natamycin.

III. Methods of Making Particles

Methods for making the anti-cancer compositions increasing Wnt signaling activity are provided. The methods generally include preparing compositions for delivering one or more active agents to increase Wnt signaling activity in cancers associated with dysregulated Wnt activity. Typically, the methods include polymer synthesis, and/or nanoparticle preparation, including encapsulation of the compositions.

A. Emulsion Methods

In some embodiments, a nanoparticle is prepared using an emulsion solvent evaporation method. For example, a polymeric material is dissolved in a water immiscible organic solvent and mixed with a drug solution or a combination of drug solutions. In some embodiments a solution of a therapeutic, prophylactic, or diagnostic agent to be encapsulated is mixed with the polymer solution. The polymer can be, but is not limited to, one or more of the following: PLA, PGA, PCL, their copolymers, polyacrylates, the aforementioned PEGylated polymers, the aforementioned Polymer-drug conjugates, the aforementioned polymer-peptide conjugates, or the aforementioned fluorescently labeled polymers, or various forms of their combinations. The drug molecules can be, but are not limited to, one or a more of the following: PPARgamma activators (e.g. Rosiglitazone, (RS)-5-[4-(2-[methyl(pyridin-2-yl)amino]ethoxy)benzyl]thiazolidine-2, 4-dione, Pioglitazone, (RS)-5-(4-[2-(5-ethylpyridin-2-yl) ethoxy]benzyl)thiazolidine-2,4-dione, Troglitazone, (RS)-5-(4-[(6-hydroxy-2,5,7,8-tetramethylchroman-2-yl)methoxy] benzyl)thiazolidine-2,4-dione etc.), prostagladin E2 analog (PGE2, (5Z,11α,13E,15S)-7-[3-hydroxy-2-(3-hydroxyoct-1-enyl)-5-oxo-cyclopentyl]hept-5-enoic acid etc.), beta3 adrenoceptor agonist (CL 316243, Disodium 5-[(2R)-2-[[(2R)-2-(3-Chlorophenyl)-2-hydroxyethyl]amino]propyl]-1,3-benzodioxole-2,2-dicarboxylate hydrate, etc.), Fibroblast Growth Factor 21 (FGF-21), Irisin, RNA, DNA, chemotherapeutic compounds, nuclear magnetic resonance (NMR) contrast agents, or combinations thereof. The water immiscible organic solvent, can be, but is not limited to, one or more of the following: chloroform, dichloromethane, and acyl acetate. The drug can be dissolved in, but is not limited to, one or more of the following: acetone, ethanol, methanol, isopropyl alcohol, acetonitrile and Dimethyl sulfoxide (DMSO).

In some embodiments, the polymer solution contains one or more polymer conjugates as described above. The polymer solution can contain a first amphiphilic polymer conjugate having a hydrophobic polymer block, a hydrophilic polymer block, and a targeting moiety conjugated to the hydrophilic end. In preferred embodiments the polymer solution contains one or more additional polymers or amphiphilic polymer conjugates. For example, the polymer solution may contain, in addition to the first amphiphilic polymer conjugate, one or more hydrophobic polymers, hydrophilic polymers, lipids, amphiphilic polymers, polymer-drug conjugates, or conjugates containing other targeting moieties. By controlling the ratio of the first amphiphilic polymer to the additional polymers or amphiphilic polymer conjugates, the density of the targeting moieties can be controlled. The first amphiphilic polymer may be present from 1% to 100% by weight of the polymers in the polymer solution. For example, the first amphiphilic polymer can be present at 10%, 20%, 30%, 40%, 50%, or 60% by weight of the polymers in the polymer solution.

An aqueous solution is then added into the resulting mixture solution to yield emulsion solution by emulsification. The emulsification technique can be, but not limited to, probe sonication or homogenization through a homogenizer. The plaque-targeted peptides or fluorophores or drugs may be associated with the surface of, encapsulated within, surrounded by, and/or distributed throughout the polymeric matrix of this particle.

Solvent Evaporation

In solvent evaporation, the polymer is dissolved in a volatile organic solvent, such as methylene chloride. The drug (either soluble or dispersed as fine particles) is added to the solution, and the mixture is suspended in an aqueous solution that contains a surface active agent such as poly (vinyl alcohol). The resulting emulsion is stirred until most of the organic solvent evaporated, leaving solid microparticles. The resulting microparticles are washed with water and dried overnight in a lyophilizer. Microparticles with different sizes (0.5-1000 microns) and morphologies can be obtained by this method. This method is useful for relatively stable polymers like polyesters and polystyrene.

B. Nanoprecipitation Method

In another embodiment, a nanoparticle is prepared using nanoprecipitation methods or microfluidic devices. A polymeric material is mixed with a drug or drug combinations in a water miscible organic solvent. The polymer can be, but is not limited to, one or more of the following: PLA, PGA, PCL, their copolymers, polyacrylates, the aforementioned PEGylated polymers, the aforementioned Polymer-drug conjugates, the aforementioned polymer-peptide conjugates, or the aforementioned fluorescently labeled polymers, or various forms of their combinations. The drug molecules can be, but are not limited to, one or more of the following: PPARgamma activators (e.g. Rosiglitazone, (RS)-5-[4-(2-[methyl(pyridin-2-yl)amino]ethoxy)benzyl]thiazolidine-2,4-dione, Pioglitazone, (RS)-5-(4-[2-(5-ethylpyridin-2-yl) ethoxy]benzyl)thiazolidine-2,4-dione, Troglitazone, (RS)-5-(4-[(6-hydroxy-2,5,7,8-tetramethylchroman-2-yl)methoxy] benzyl)thiazolidine-2,4-dione etc.), prostaglandin E2 analog (PGE2, (5Z,11a,13E,15S)-7-[3-hydroxy-2-(3-hydroxyoct-1-enyl)-5-oxo-cyclopentyl] hept-5-enoic acid etc.), beta3 adrenoceptor agonist (CL 316243, Disodium 5-[(2R)-2-[[(2R)-2-(3-Chlorophenyl)-2-hydroxyethyl]amino]propyl]-1,3-benzodioxole-2,2-dicarboxylate hydrate, etc.), RNA, DNA, chemotherapeutic compounds, nuclear magnetic resonance (NMR) contrast agents, or combinations thereof. The water-miscible organic solvent, can be, but is not limited to, one or more of the following: acetone, ethanol, methanol, isopropyl alcohol, acetonitrile and Dimethyl sulfoxide (DMSO). The resulting mixture solution is then added to a polymer non-solvent, such as an aqueous solution, to yield nanoparticle solution. The plaque-targeted peptides or fluorophores or drugs may be associated with the surface of, encapsulated within, surrounded by, and/or distributed throughout the polymeric matrix of this particle.

C. Microfluidics

Methods of making nanoparticles using microfluidics are known in the art. Suitable methods include those described in U.S. Patent Application Publication No. 2010/0022680 A1 by Karnik et al. In general, the microfluidic device includes at least two channels that converge into a mixing apparatus. The channels are typically formed by lithography, etching, embossing, or molding of a polymeric surface. A source of fluid is attached to each channel, and the application of pressure to the source causes the flow of the fluid in the channel. The pressure may be applied by a syringe, a pump, and/or gravity. The inlet streams of solutions with polymer, targeting moieties, lipids, drug, payload, etc. converge and mix, and the resulting mixture is combined with a polymer non-solvent solution to form the nanoparticles having the desired size and density of moieties on the surface. By varying the pressure and flow rate in the inlet channels and the nature and composition of the fluid sources nanoparticles can be produced having reproducible size and structure.

D. Spray-Drying

In this method, the polymer is dissolved in organic solvent. A known amount of the active drug is suspended (insoluble drugs) or co-dissolved (soluble drugs) in the polymer solution. The solution or the dispersion is then spray-dried. Typical process parameters for a mini-spray drier (Buchi) are as follows: polymer concentration=0.04 g/mL, inlet temperature=−24° C., outlet temperature=13-15□C., aspirator setting=15, pump setting=10 mL/minute, spray flow=600 Nl/hr, and nozzle diameter=0.5 mm. Microparticles ranging between 1-10 microns are obtained with a morphology which depends on the type of polymer used.

E. Hydrogel Microparticles

Microparticles made of gel-type polymers, such as alginate, are produced through traditional ionic gelation techniques. The polymers are first dissolved in an aqueous solution, mixed with barium sulfate or some bioactive agent, and then extruded through a microdroplet forming device, which in some instances employs a flow of nitrogen gas to break off the droplet. A slowly stirred (approximately 100-170 RPM) ionic hardening bath is positioned below the extruding device to catch the forming microdroplets. The microparticles are left to incubate in the bath for twenty to thirty minutes in order to allow sufficient time for gelation to occur. Microparticle particle size is controlled by using various size extruders or varying either the nitrogen gas or polymer solution flow rates. Chitosan microparticles can be prepared by dissolving the polymer in acidic solution and crosslinking it with tripolyphosphate. Carboxymethyl cellulose (CMC) microparticles can be prepared by dissolving the polymer in acid solution and precipitating the microparticle with lead ions. In the case of negatively charged polymers (e.g., alginate, CMC), positively charged ligands (e.g., polylysine, polyethyleneimine) of different molecular weights can be ionically attached.

IV. Formulations

Formulations and pharmaceutical compositions containing an effective amount of the compositions for increasing Wnt signaling activity, in a pharmaceutical carrier appropriate for administration to an individual in need thereof to treat one or more symptoms of cancer are provided.

In a preferred embodiment, the active agent increasing Wnt activity is an agent that reduces one or more inhibitors of the Wnt signaling pathway. One such agent that enhances Wnt activity is an inhibitor of APC-mediated activities, such as an inhibitor of GSK-3. Therefore, in some embodiments, pharmaceutical formulations include one or more GSK-3 inhibitors are described for increasing Wnt activity beyond a threshold value in cancer cells characterized by increased Wnt activity, to treat cancer in a subject. In a preferred embodiment the pharmaceutical formulations include the small molecule inhibitor LY2090314, having the molecular structure set forth below:

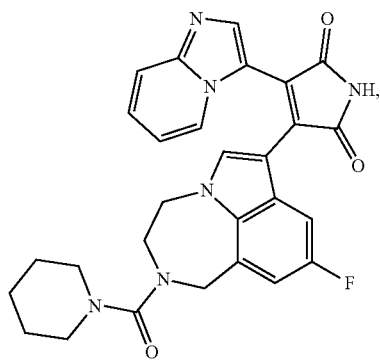 [SMILES: O=C1NC(=O)C(c2cnc3ccccn23)=C1c1cn2c3c(cc(F)cc13)CN(C(=O)N1CCCCC1)CC2]

or a derivative, or analog, or prodrug thereof.

Due to the short serum half-life of LY2090314, the efficacy of LY2090314 for treating and preventing cancer in a subject is increased by one or more shielding agents or delivery systems that protect the LY2090314 molecule in the body of the subject. Therefore, in preferred embodiments, pharmaceutical formulations include LY2090314 protected within one or more shielding agents or delivery systems. A preferred delivery system is a nanoparticle encapsulating, complexed with, or otherwise associated with LY2090314. Therefore, pharmaceutical formulations including one or more GSK-3 inhibitors associated with nanoparticles are described.

Proper formulation is dependent upon the route of administration chosen. In preferred embodiments, compositions for increasing Wnt signaling activity are formulated for parenteral delivery (e.g., by intramuscular, intraperitoneal, intravenous (IV) or subcutaneous injection or infusion). In some embodiments, the compositions are formulated for intratumoral injection. It may also be possible to administer topically (e.g., to a mucosal surface such as the mouth, lungs, intranasal, intravaginally, etc.). Therefore, compositions for increasing Wnt signaling activity are designed to be administered locally, or systemically. The compositions can be stored lyophilized in single use vials for rehydration immediately before use. Therefore, in some embodiments, compositions for increasing Wnt signaling activity are lyophilized. For example, in some embodiments, the compositions for increasing Wnt signaling activity are lyophilized within single use vials for rehydration immediately before use. Other means for rehydration and administration are known to those skilled in the art.

Pharmaceutical formulations of active agents for increasing Wnt signaling activity typically contain the one or more active agents in combination with one or more pharmaceutically acceptable excipients. Representative excipients include solvents, diluents, pH modifying agents, preservatives, antioxidants, suspending agents, wetting agents, viscosity modifiers, tonicity agents, stabilizing agents, and combinations thereof. Suitable pharmaceutically acceptable excipients are preferably selected from materials which are generally recognized as safe (GRAS), and may be administered to an individual without causing undesirable biological side effects or unwanted interactions.

Generally, pharmaceutically acceptable salts can be prepared by reaction of the free acid or base forms of an active agent with a stoichiometric amount of the appropriate base or acid in water or in an organic solvent, or in a mixture of the two; generally, non-aqueous media like ether, ethyl acetate, ethanol, isopropanol, or acetonitrile are preferred. Pharmaceutically acceptable salts include salts of an active agent derived from inorganic acids, organic acids, alkali metal salts, and alkaline earth metal salts as well as salts formed by reaction of the drug with a suitable organic ligand (e.g., quaternary ammonium salts). Lists of suitable salts are found, for example, in Remington's Pharmaceutical Sciences, 20th ed., Lippincott Williams & Wilkins, Baltimore, MD, 2000, p. 704.

In some embodiments, the compositions for increasing Wnt signaling activity are formulated in dosage unit form for ease of administration and uniformity of dosage. The phrase "dosage unit form" refers to a physically discrete unit of active agents appropriate for the patient to be treated. It will be understood, however, that the total single administration of the compositions will be decided by the attending physician within the scope of sound medical judgment. In some embodiments, the therapeutically effective dose of agents for increasing Wnt signaling activity is estimated initially either in cell culture assays or in animal models, usually mice, rabbits, dogs, or pigs. The animal model is also used to achieve a desirable concentration range and route of administration. Such information should then be useful to determine useful doses and routes for administration in humans. Therapeutic efficacy and toxicity of conjugates can be determined by standard pharmaceutical procedures in cell cultures or experimental animals, e.g., ED50 (the dose is therapeutically effective in 50% of the population) and LD50 (the dose is lethal to 50% of the population). The dose ratio of toxic to therapeutic effects is the therapeutic index and it can be expressed as the ratio, LD50/ED50. Pharmaceutical compositions which exhibit large therapeutic indices are preferred. The data obtained from cell culture assays and animal studies can be used in formulating a range of dosages for human use.

Pharmaceutical compositions formulated for administration by parenteral (intramuscular, intraperitoneal, intravenous (IV) or subcutaneous injection), enteral routes of administration are described.

A. Parenteral Administration

The phrases "parenteral administration" and "administered parenterally" are art-recognized terms, and include modes of administration other than enteral and topical administration, such as injections, and include without limitation intravenous, intramuscular, intravascular, intrathecal, intracapsular, intraorbital, intracardiac, intradennal, intraperitoneal, transtracheal, subcutaneous, subcuticular, intraarticular, subcapsular, subarachnoid, and intraspinal injection and infusion. Compositions for increasing Wnt signaling activity can be administered parenterally, for example, by subdural, intravenous, intrathecal, intraventricular, intraarterial, intra-articular, intra-synovial, intra-amniotic, intraperitoneal, or subcutaneous routes.

For liquid formulations, pharmaceutically acceptable carriers may be, for example, aqueous or non-aqueous solutions, suspensions, emulsions, or oils. Parenteral vehicles (for subcutaneous, intravenous, intraarterial, or intramuscular injection) include, for example, sodium chloride solution, Ringer's dextrose, dextrose and sodium chloride, lactated Ringer's and fixed oils. Examples of non-aqueous solvents are propylene glycol, polyethylene glycol, and injectable organic esters such as ethyl oleate. Aqueous carriers include, for example, water, alcoholic/aqueous solutions, cyclodextrins, emulsions or suspensions, including saline and buffered media. Compositions for increasing Wnt signaling activity can also be administered in an emulsion, for example, water in oil. Examples of oils are those of petroleum, animal, vegetable, or synthetic origin, for example, peanut oil, soybean oil, mineral oil, olive oil, sunflower oil, fish-liver oil, sesame oil, cottonseed oil, corn oil, olive, petrolatum, and mineral. Suitable fatty acids for use in parenteral formulations include, for example, oleic acid, stearic acid, and isostearic acid. Ethyl oleate and isopropyl myristate are examples of suitable fatty acid esters.

Formulations suitable for parenteral administration can include antioxidants, buffers, bacteriostats, and solutes that render the formulation isotonic with the blood of the intended recipient, and aqueous and non-aqueous sterile suspensions that can include suspending agents, solubilizers, thickening agents, stabilizers, and preservatives. Intravenous vehicles can include fluid and nutrient replenishers, electrolyte replenishers such as those based on Ringer's dextrose. In general, water, saline, aqueous dextrose and related sugar solutions, and glycols such as propylene glycols or polyethylene glycol are preferred liquid carriers, particularly for injectable solutions.

Injectable pharmaceutical carriers for injectable compositions are well-known to those of ordinary skill in the art (see, e.g., Pharmaceutics and Pharmacy Practice, J. B. Lippincott Company, Philadelphia, PA, Banker and Chalmers, eds., pages 238-250 (1982), and ASHP Handbook on Injectable Drugs, Trissel, 15th ed., pages 622-630 (2009)).

B. Enteral Administration

In some embodiments, compositions for increasing Wnt signaling activity are administered enterally. The carriers or diluents may be solid carriers or diluents for solid formulations, liquid carriers or diluents for liquid formulations, or mixtures thereof.

For liquid formulations, pharmaceutically acceptable carriers may be, for example, aqueous or non-aqueous solutions, suspensions, emulsions, or oils. Examples of non-aqueous solvents are propylene glycol, polyethylene glycol, and injectable organic esters such as ethyl oleate. Aqueous carriers include, for example, water, alcoholic/aqueous solutions, cyclodextrins, emulsions or suspensions, including saline and buffered media.

Examples of oils are those of petroleum, animal, vegetable, or synthetic origin, for example, peanut oil, soybean oil, mineral oil, olive oil, sunflower oil, fish-liver oil, sesame oil, cottonseed oil, corn oil, olive, petrolatum, and mineral. Suitable fatty acids for use in parenteral formulations include, for example, oleic acid, stearic acid, and isostearic acid. Ethyl oleate and isopropyl myristate are examples of suitable fatty acid esters.

Vehicles include, for example, sodium chloride solution, Ringer's dextrose, dextrose and sodium chloride, lactated Ringer's and fixed oils. Formulations include, for example, aqueous and non-aqueous, isotonic sterile injection solutions, which can contain antioxidants, buffers, bacteriostats, and solutes that render the formulation isotonic with the blood of the intended recipient, and aqueous and non-aqueous sterile suspensions that can include suspending agents, solubilizers, thickening agents, stabilizers, and preservatives. Vehicles can include, for example, fluid and nutrient replenishers, electrolyte replenishers such as those based on Ringer's dextrose. In general, water, saline, aqueous dextrose and related sugar solutions are preferred liquid carriers. These can also be formulated with proteins, fats, saccharides, and other components of infant formulas.

In certain embodiments, the compositions are formulated for oral administration. Oral formulations may be in the form of chewing gum, gel strips, tablets, capsules, or lozenges. Encapsulating substances for the preparation of enteric-coated oral formulations include cellulose acetate phthalate, polyvinyl acetate phthalate, hydroxypropyl methylcellulose phthalate and methacrylic acid ester copolymers. Solid oral formulations such as capsules or tablets are preferred. Elixirs and syrups also are well known oral formulations.

V. Methods of Use

Methods of using compositions for increasing Wnt signaling activity within cancer cells are provided.

A. Treatment of Cancer

It has been established that increasing Wnt activity beyond a threshold value in cancers that exhibit by high Wnt activity results in diminished cancer cell proliferation and reduction in tumor burden. Therefore, methods of treating cancers, in particular those associated with high Wnt signaling activity and mutations inactivating the APC gene, are provided. The methods typically include administering to a subject in a need thereof an effective amount of a compositions for increasing Wnt signaling activity to treat or prevent a cancer characterized by increased Wnt activity in the subject.

In some embodiments, the methods administer one or more active agents to increase Wnt signaling encapsulated or associated with nanoparticles to a subject having, or identified as being at risk of having a cancer associated with dysregulated Wnt activity. In a preferred embodiment, the methods administer an inhibitor of GSK-3. Therefore, in preferred embodiments, methods of treating cancer in a subject include administering to the subject one or more GSK-3 inhibitors encapsulated or associated with nanoparticles to a subject having, or identified as being at risk of having a cancer associated with dysregulated Wnt activity. A preferred GSK-3 inhibitor is the small molecule inhibitor LY2090314. Therefore, in preferred embodiments, methods of treating cancer in a subject include administering to the subject LY2090314 encapsulated or associated with nanoparticles to a subject having, or identified as being at risk of having a cancer associated with dysregulated Wnt activity.

In preferred embodiments, one or more active agents that increase Wnt signaling are administered to cancer cells in a subject in amount effective to increase Wnt signaling activity in the cancer cells of the subject. For example, in some embodiments, one or more active agents that reduce or inhibit GSK-3 activity are administered to cancer cells in a subject in amount effective to reduce or inhibit GSK-3 activity in the cancer cells of the subject. For example, in some embodiments, LY2090314 is administered to cancer cells in a subject in amount effective to reduce or inhibit GSK-3 activity in the cancer cells of the subject. Because the inactivation of GSK-3 enhances Wnt activity beyond a threshold necessary for cancer cell survival and proliferation, administering agents that reduce or inhibit GSK-3 activity to the subject in an amount effective to inactivate GSK-3 is effective to treat or prevent one or more symptoms of cancer in the subject. Therefore, in preferred embodiments, methods of treating cancer in a subject include administering to the subject one or more GSK-3 inhibitors, such as LY2090314, encapsulated or associated with nanoparticles, in an amount effective to prevent or reduce one or more symptoms of the cancer in the subject.

In some embodiments, methods of GSK3 inhibition are used in combination with one or more Wnt agonists to enhance the efficacy of the treatment. In some embodiments, the methods involve using a combination of one or more Wnt agonists with one or more GSK3 inhibitors. For example, in preferred embodiments, R-Spondin 1 and/or R-Spondin 3 are used in combination with one or more GSK3 inhibitors (e.g., LY2090314) to treat colon cancer. Based on the studies to date, the effective dose of each class of compound will be less than if the compound is administered alone, since the combination shows "synergy", i.e., the result of treating cancer cells with both classes of compounds is greater than what would be expected from treatment with either class alone, or the additive effective dose thereof. In some embodiments, the effective amount of one or both agents used in combination is lower than the effective amount of each agent when administered separately. This may provide benefits to efficacy since a greater dose of the compounds in combination can be used that is safer than using the same amount of just one class of compound. The term "combination" or "combined" is used to refer to either concomitant, simultaneous, or sequential administration of the GSK3 inhibitor and the Wnt agonist. The combinations can be administered either separately but simultaneously (e.g., via separate intravenous lines into the same subject; one agent is given orally while the other agent is given by infusion or injection, etc.), or sequentially (e.g., one agent is given first followed by the second). There may be a different time period between administration of the two compounds, and there may be a different time period between treatment cycles.

Preferably, one or more components of the combination treatment are encapsulated within nanoparticles with or without controlled release formulation.

B. Treatment Regimen

Methods of using compositions for increasing Wnt signaling activity within cancer cells can include one or more treatment regimens. A treatment regimen can include one or multiple administrations of compositions that increase Wnt signaling to achieving a desired physiological change. For example, in some embodiments, the methods of treatment include administering to a subject, such as a mammal, especially a human being, an effective amount of the compositions that increase Wnt signaling to treat a cancer characterized by increased Wnt signaling activity or symptom thereof and/or to produce a physiological change in the subject.

1. Dosages and Effective Amounts

In some embodiments, methods of treating cancer in a subject include administering compositions for increasing Wnt signaling activity within cancer cells in an amount effective to treat the cancer. The methods typically administer to the subject an effective amount of a composition for increasing Wnt signaling activity in the cancer cells of the subject to reduce cancer cell proliferation and/or reduce cancer cell viability in the subject. Exemplary methods of increasing Wnt signaling activity include GSK3 inhibition (e.g., using GSK3 inhibitors) and/or increasing Wnt signaling (e.g., using Wnt agonists). Preferably, when one or more classes of active agents are used in combination to increase Wnt signaling, the reduction in cancer cell proliferation or viability in the subject with cancer is more than the additive reduction achieved by administering each of the agents alone.

It has been established that the proliferation and viability of cancer cells in a subject with cancer can be diminished and prevented by increasing Wnt activity of the cancer cells, whereby the same increase in Wnt activity enhances the growth and proliferation of healthy cells in the same subject. This makes compositions for increasing Wnt signaling activity for treating cancer particularly safe and efficacious with reduced or minimal side effects associated with conventional chemotherapeutic agents for a given cancer type. The increased proliferation or viability of healthy cells in the subject may be advantageous to the subject, for example, to increase healing or tissue regeneration in the subject. Therefore, in some embodiments, the amount of the composition increases or stimulates the proliferation and/or viability of healthy cells in the subject. In an exemplary embodiment, an amount of a composition for increasing Wnt signaling activity administered to a subject is effective to reduce tumor cell proliferation and viability, and also to enhance the proliferation and viability of normal healthy cells in the subject. Therefore, in some embodiments, the amount of the composition is effective to enhance healing or tissue repair in the subject, for example, a subject who has undergone surgery, chemotherapy or another injurious therapy or procedure. In an exemplary embodiment, the amount of the composition reduces colon cancer cell viability, proliferation or metastasis, while enhancing the regeneration of colon tissue in a subject, for example, a subject who has received surgery to remove colon cancer.

Dosage and dosing regimens are dependent on the severity and location of the disorder or injury and/or methods of administration, and is known to those skilled in the art. Therapeutically effective amounts of the compositions used in the treatment of cancer are typically sufficient to reduce or alleviate one or more symptoms of cancer. Symptoms of cancer may be physical, such as tumor burden, or biological such as proliferation of cancer cells. Accordingly, the amount of the composition can be effective to, for example, kill tumor cells or inhibit proliferation or metastasis of the tumor cells. Preferably the composition including one or more active agents, for example GSK3αβ inhibitors, are preferentially delivered to cells in and around tumor tissues. Preferably the active agents do not target or otherwise modulate the activity or quantity of healthy cells not within or associated with tumor tissues, or do so at a reduced level compared to cancer or cancer-associated cells. In this way, by-products and other side effects associated with the compositions are reduced, preferably leading directly or indirectly to cancer cell death. In some embodiments, the compositions for increasing Wnt signaling activity directly or indirectly reduce cancer cell migration, angiogenesis, immune escape, radioresistance, or a combination thereof. In some embodiments, the compositions for increasing Wnt signaling activity directly or indirectly induce a change in the cancer cell itself or its microenvironment that suppresses proliferation of the cancer cells, or induces apoptosis of the cancer cells, or induces activation of an immune response against the cancer cells, or combinations thereof.

In some in vivo approaches, compositions for increasing Wnt signaling activity are administered to a subject in a therapeutically effective amount to reduce tumor size. For example, in some embodiments, an effective amount of the compositions for increasing Wnt signaling activity is used to put cancer in remission and/or keep the cancer in remission. Also provided are effective amounts of compositions for increasing Wnt signaling activity to reduce or stop cancer stem cell proliferation.

The actual effective amounts of the compositions can vary according to factors including the specific active agent administered, the particular composition formulated, the mode of administration, and the age, weight, condition of the subject being treated, as well as the route of administration and the disease or disorder. In some embodiments, the compositions for increasing Wnt signaling activity are administered by a route selected from intravenous, intramuscular, intravascular, intrapericardial, intrathecal, intracapsular, intraorbital, intracardiac, intraperitoneal, subcutaneous, intraarticular, subarachnoid, intraspinal, and oral. In preferred embodiments, compositions for increasing Wnt signaling activity are administered parenterally, for example, by subdural, intravenous, intrathecal, intraventricular, intraarterial, intraperitoneal, or subcutaneous routes. In other embodiments, compositions for increasing Wnt signaling activity are administered enterally. Generally, for intravenous injection or infusion, the dosage may be lower.

In general, the timing and frequency of administration will be adjusted to balance the efficacy of a given treatment or diagnostic schedule with the side-effects of the given delivery system. Exemplary dosing frequencies include continuous infusion, single and multiple administrations such as hourly, daily, weekly, monthly or yearly dosing.

In some embodiments, dosages are administered once, twice, or three times daily, or every other day, two days, three days, four days, five days, or six days to a human. In some embodiments, dosages are administered about once or twice every week, every two weeks, every three weeks, or every four weeks. In some embodiments, dosages are administered about once or twice every month, every two months, every three months, every four months, every five months, or every six months.

It will be understood by those of ordinary skill that a dosing regimen can be any length of time sufficient to treat the condition in the subject. In some embodiments, the regimen includes one or more cycles of a round of therapy followed by a drug holiday (e.g., no drug). The drug holiday can be 1, 2, 3, 4, 5, 6, or 7 days; or 1, 2, 3, 4 weeks, or 1, 2, 3, 4, 5, or 6 months.

Dosage forms of compositions for increasing Wnt signaling activity within cancer cells are also described. In some embodiments, a dosage form of a GSK-3 inhibitor encapsulated in nanoparticles is an amount effective to increase Wnt signaling activity in cancer cells of a subject and reduce cancer cell proliferation and/or reduce cancer cell viability in the subject, in a form suitable for parenteral or enteral administration. In an exemplary embodiment, the dosage form of is in an amount effective to increase Wnt signaling activity in cancer cell, but does not reduce the proliferation and/or viability of healthy cells in the subject.

In some embodiments, the effective concentrations of the GSK-3 inhibitors suitable for administration are between about 0.1 micromolar and about 10 micromolar.

2. Controls

The therapeutic result of the compositions for increasing Wnt signaling activity can be compared to a control. Suitable controls are known in the art and include, for example, untreated cells or an untreated subject. A typical control is a comparison of a condition or symptom of a subject prior to and after administration of the targeted agent. The condition or symptom can be a biochemical, molecular, physiological, or pathological readout. For example, the effect of the composition on a particular symptom, pharmacologic, or physiologic indicator can be compared to an untreated subject, or the condition of the subject prior to treatment. In some embodiments, the symptom, pharmacologic, or physiologic indicator is measured in a subject prior to treatment, and again one or more times after treatment is initiated. In some embodiments, the control is a reference level, or average determined based on measuring the symptom, pharmacologic, or physiologic indicator in one or more subjects that do not have the disease or condition to be treated (e.g., healthy subjects). In some embodiments, the effect of the treatment is compared to a conventional treatment that is known the art.

C. Combination Therapies and Procedures

The compositions for increasing Wnt signaling activity can be further administered alone or in combination with one or more conventional therapies, or procedures for example, a conventional cancer therapy or surgery.

In some embodiments, the conventional cancer therapy is in the form of one or more additional active agents. Therefore, in some embodiments, the methods administer compositions for increasing Wnt signaling activity in combination with one or more additional active agents. The combination therapies can include administration of the compositions for increasing Wnt signaling activity and additional active agents together in the same admixture, or in separate admixtures. Therefore, in some embodiments, the methods administer a pharmaceutical formulation including compositions for increasing Wnt signaling activity as well as one, two, three, or more additional active agents. Such formulations typically include an effective amount of compositions for increasing Wnt signaling activity and an effective amount of an additional therapeutic, prophylactic or diagnostic agent. The additional active agent(s) can have the same, or different mechanisms of action. In some embodiments, the combination results in an additive effect on the treatment of the cancer. In some embodiments, the combinations result in a more than additive effect on the treatment of the disease or disorder.

The additional therapy or procedure can be simultaneous or sequential with the administration of the compositions for increasing Wnt signaling activity. In some embodiments the additional therapy is performed between drug cycles or during a drug holiday that is part of the composition dosage regime. For example, in some embodiments, the additional therapy or procedure is surgery, a radiation therapy, or chemotherapy.

Additional therapeutic agents include conventional cancer therapeutics such as chemotherapeutic agents, cytokines, chemokines, and radiation therapy, as discussed above. The majority of chemotherapeutic drugs can be divided into alkylating agents, antimetabolites, anthracyclines, plant alkaloids, topoisomerase inhibitors, and other antitumor agents. These drugs affect cell division or DNA synthesis and function in some way. Additional therapeutics include monoclonal antibodies and the tyrosine kinase inhibitors e.g., imatinib mesylate (GLEEVEC® or GLIVEC®), which directly targets a molecular abnormality in certain types of cancer (chronic myelogenous leukemia, gastrointestinal stromal tumors).

In some embodiments, the additional therapy is a chemotherapeutic agent. Representative chemotherapeutic agents include, but are not limited to, amsacrine, bleomycin, busulfan, camptothecin, capecitabine, carboplatin, carmustine, chlorambucil, cisplatin, cladribine, clofarabine, crisantaspase, cyclophosphamide, cytarabine, dacarbazine, dactinomycin, daunorubicin, docetaxel, doxorubicin, epipodophyllotoxins, epirubicin, etoposide, etoposide phosphate, fludarabine, fluorouracil, gemcitabine, hydroxycarb amide, idarubicin, ifosfamide, innotecan, leucovorin, liposomal doxorubicin, liposomal daunorubici, lomustine, mechlorethamine, melphalan, mercaptopurine, mesna, methotrexate, mitomycin, mitoxantrone, oxaliplatin, paclitaxel, pemetrexed, pentostatin, procarbazine, raltitrexed, satraplatin, streptozocin, teniposide, tegafur-uracil, temozolomide, teniposide, thiotepa, tioguanine, topotecan, treosulfan, vinblastine, vincristine, vindesine, vinorelbine, vorinostat, taxol, trichostatin A and derivatives thereof, trastuzumab (HERCEPTIN®), cetuximab, and rituximab (RITUXAN® or MABTHERA®), bevacizumab (AVASTIN®), and combinations thereof. Representative pro-apoptotic agents include, but are not limited to, fludarabinetaurosporine, cycloheximide, actinomycin D, lactosylceramide, 15d-PGJ(2)5 and combinations thereof.

In the case of treating colorectal cancer, the additional chemotherapeutic therapy and regimens include FOLFOX (leucovorin calcium, fluorouracil, and oxaliplatin), CAPEOX (capecitabine and oxaliplatin), FOLFIRI (leucovorin calcium, fluorouracil, and irinotecan), FOLFOXIRI (leucovorin calcium, fluorouracil, oxaliplatin, and irinotecan), and 5-FU/LV (5-fluorouracil and leucovorin calcium), preferably as designated by the NCCN guidelines. An exemplary regimen of FOLFOX includes Day 1: Oxaliplatin 85 mg/m$^2$ IV over 2 hours, with Day 1: Leucovorin 400 mg/m$^2$ IV over 2 hours, followed by Days 1-2: Fluorouracil 400 mg/m$^2$ IV push on day 1, then 1,200 mg/m2/day×2 days (total 2,400 mg/m$^2$ over 46-48 hours) IV continuous infusion; repeat cycle every 2 weeks. A further exemplary regimen of FOLFOX includes Day 1: Oxaliplatin 85 mg/m$^2$ IV over 2 hours, with Day 1: Leucovorin 400 mg/m$^2$ IV over 2 hours IV, followed by Days 1-2: Fluorouracil 1,200 mg/m$^2$/day (total 2,400 mg/m$^2$ over 46-48 hours) IV continuous infusion; repeat every 2 weeks. In some embodiments, the additional chemotherapeutic therapy is FOLFOX plus bevacizumab; FOLFOX plus cetuximab; or FOLFOX plus panitumumab, preferably as designated by the NCCN guidelines.

In some embodiments, the compositions and methods are used prior to or in conjunction with an immunotherapy such as inhibition of checkpoint proteins such as components of the PD-1/PD-L1 axis or CD28-CTLA-4 axis using one or more immune checkpoint modulators (e.g., PD-1 antagonists, PD-1 ligand antagonists, and CTLA4 antagonists), adoptive T cell therapy, and/or a cancer vaccine. Exemplary immune checkpoint modulators used in immunotherapy include Pembrolizumab (anti-PD1 mAb), Durvalumab (anti-PDL1 mAb), PDR001 (anti-PD1 mAb), Atezolizumab (anti-PDL1 mAb), Nivolumab (anti-PD1 mAb), Tremelimumab (anti-CTLA4 mAb), Avelumab (anti-PDL1 mAb), and RG7876 (CD40 agonist mAb).

In some embodiments the additional therapy is adoptive T cell therapy. Methods of adoptive T cell therapy are known in the art and used in clinical practice. Generally adoptive T cell therapy involves the isolation and ex vivo expansion of tumor specific T cells to achieve greater number of T cells than what could be obtained by vaccination alone. The tumor specific T cells are then infused into patients with cancer in an attempt to give their immune system the ability to overwhelm remaining tumor via T cells, which can attack and kill the cancer. Several forms of adoptive T cell therapy can be used for cancer treatment including, but not limited to, culturing tumor infiltrating lymphocytes or TIL; isolating and expanding one particular T cell or clone; and using T cells that have been engineered to recognize and attack tumors. In some embodiments, the T cells are taken directly from the patient's blood. Methods of priming and activating T cells in vitro for adaptive T cell cancer therapy are known in the art. See, for example, Wang, et al, *Blood,* 109(11): 4865-4872 (2007) and Hervas-Stubbs, et al, *J. Immunol.,* 189(7):3299-310 (2012).

Historically, adoptive T cell therapy strategies have largely focused on the infusion of tumor antigen specific cytotoxic T cells (CTL) which can directly kill tumor cells. However, CD4+T helper (Th) cells such as Th1, Th2, Tfh, Treg, and Th17 can also be used. Th can activate antigen-specific effector cells and recruit cells of the innate immune system such as macrophages and dendritic cells to assist in antigen presentation (APC), and antigen primed Th cells can directly activate tumor antigen-specific CTL. As a result of activating APC, antigen specific $Th_1$ have been implicated as the initiators of epitope or determinant spreading which is a broadening of immunity to other antigens in the tumor. The ability to elicit epitope spreading broadens the immune response to many potential antigens in the tumor and can lead to more efficient tumor cell kill due to the ability to mount a heterogeneic response. In this way, adoptive T cell therapy can used to stimulate endogenous immunity. In some embodiments, the T cells express a chimeric antigen receptor (CARs, CAR T cells, or CARTs). Artificial T cell receptors are engineered receptors, which graft a particular specificity onto an immune effector cell. Typically, these receptors are used to graft the specificity of a monoclonal antibody onto a T cell and can be engineered to target virtually any tumor associated antigen. First generation CARs typically had the intracellular domain from the CD3 ζ-chain, which is the primary transmitter of signals from endogenous TCRs. Second generation CARs add intracellular signaling domains from various costimulatory protein receptors (e.g., CD28, 41BB, ICOS) to the cytoplasmic tail of the CAR to provide additional signals to the T cell, and third generation CARs combine multiple signaling domains, such as CD3z-CD28-41BB or CD3z-CD28-OX40, to further enhance effectiveness.

In some embodiments, the compositions and methods are used prior to or in conjunction with a cancer vaccine, for example, a dendritic cell cancer vaccine. Vaccination typically includes administering a subject an antigen (e.g., a cancer antigen) together with an adjuvant to elicit therapeutic T cells in vivo. In some embodiments, the cancer vaccine is a dendritic cell cancer vaccine in which the antigen delivered by dendritic cells primed ex vivo to present the cancer antigen. Examples include PROVENGE® (sipuleucel-T), which is a dendritic cell-based vaccine for the treatment of prostate cancer (Ledford, et al., *Nature,* 519, 17-18 (5 Mar. 2015). Such vaccines and other compositions and methods for immunotherapy are reviewed in Palucka, et al., *Nature Reviews Cancer,* 12, 265-277 (April 2012).

In some embodiments, the compositions and methods are used prior to or in conjunction with surgical removal of tumors, for example, in preventing primary tumor metastasis. In some embodiments, the compositions and methods are used to enhance body's own anti-tumor immune functions.

D. Subjects to be Treated

In general, methods of administering compositions for increasing Wnt signaling activity are useful in the context of treating cancer, including tumor therapy. All the methods described can include the step of identifying and selecting a subject in need of treatment, or a subject who would benefit from administration with the compositions.

Typically, the subjects to be treated have a proliferative disease, such as a benign or malignant tumor. In some embodiments, the subjects to be treated have been diagnosed with stage I, stage II, stage III, or stage IV cancer.

The term cancer refers specifically to a malignant tumor. In addition to uncontrolled growth, malignant tumors exhibit metastasis. In this process, small clusters of cancerous cells dislodge from a tumor, invade the blood or lymphatic vessels, and are carried to other tissues, where they continue to proliferate. In this way a primary tumor at one site can give rise to a secondary tumor at another site.

The compositions and methods are useful for treating subjects having benign or malignant tumors by delaying or inhibiting the growth of a tumor in a subject, reducing the growth or size of the tumor, inhibiting, or reducing metastasis of the tumor, and/or inhibiting or reducing symptoms associated with tumor development or growth.

Malignant tumors which may be treated are classified according to the embryonic origin of the tissue from which the tumor is derived. Carcinomas are tumors arising from endodermal or ectodermal tissues such as skin or the epithelial lining of internal organs and glands. The compositions are particularly effective in treating carcinomas. Sarcomas, which arise less frequently, are derived from mesodermal connective tissues such as bone, fat, and cartilage. The leukemias and lymphomas are malignant tumors of hematopoietic ceils of the bone marrow. Leukemias proliferate as single cells, whereas lymphomas tend to grow as tumor masses. Malignant tumors may show up at numerous organs or tissues of the body to establish a cancer.

The types of cancer that can be treated with the provided compositions and methods include, but are not limited to, cancers such as colorectal cancer, peritoneal carcinomatosis, pancreatic cancer, (the term adenocarcinoma is not tissue specific), multiple myeloma, sarcomas, brain, breast, esophageal, liver, lung, stomach, and uterine. In some embodiments, the compositions are used to treat multiple cancer types concurrently. The compositions can also be used to treat metastases or tumors at multiple locations. Some cancer types are directly WNT driven, for example, hepatocellular carcinoma, cholangiocarcinoma and medulloblastoma. Thus, in preferred embodiments, the cancer to be treated are hepatocellular carcinoma, cholangiocarcinoma and medulloblastoma Exemplary cancers that can be treated include brain tumors including, but not limited to, glioma, astrocytoma, brain stem glioma, ependymoma, oligodendroglioma, nonglial tumor, acoustic neurinoma, craniopharyngioma, medulloblastoma, meningioma, pineocytoma, pineoblastoma, primary brain lymphoma; breast cancer including, but not limited to, adenocarcinoma, lobular (small cell) carcinoma, intraductal carcinoma, medullary breast cancer, mucinous breast cancer, tubular breast cancer, papillary breast cancer, Paget's disease, and inflammatory breast cancer; adrenal cancer, including, but not limited to, pheochromocytom and adrenocortical carcinoma; thyroid cancer such as but not limited to papillary or follicular thyroid cancer, medullary thyroid cancer and anaplastic thyroid cancer; pancreatic cancer, including, but not limited to, insulinoma, gastrinoma, glucagonoma, vipoma, somatostatin-secreting tumor, and carcinoid or islet cell tumor; pituitary cancers including, but not limited to, Cushing's disease, prolactin-secreting tumor, acromegaly, and diabetes insipius; eye cancers including, but not limited to, ocular melanoma such as iris melanoma, choroidal melanoma, and ciliary body melanoma, and retinoblastoma; vaginal cancers, including, but not limited to, squamous cell carcinoma, adenocarcinoma, and melanoma; vulvar cancer, including, but not limited to, squamous cell carcinoma, melanoma, adenocarcinoma, basal cell carcinoma, sarcoma, and Paget's disease; cervical cancers including, but not limited to, squamous cell carcinoma, and adenocarcinoma; uterine cancers including, but not limited to, endometrial carcinoma and uterine sarcoma; ovarian cancers including, but not limited to, ovarian epithelial carcinoma, borderline tumor, germ cell tumor, and stromal tumor; esophageal cancers including, but not limited to, squamous cancer, adenocarcinoma, adenoid cyctic carcinoma, mucoepidermoid carcinoma, adenosquamous carcinoma, sarcoma, melanoma, plasmacytoma, verrucous carcinoma, and oat cell (small cell) carcinoma; stomach cancers including, but not limited to, adenocarcinoma, fungating (polypoid), ulcerating, superficial spreading, diffusely spreading, malignant lymphoma, liposarcoma, fibrosarcoma, and carcinosarcoma; colon cancers; rectal cancers; liver cancers including, but not limited to, hepatocellular carcinoma and hepatoblastoma, gallbladder cancers including, but not limited to, adenocarcinoma; cholangiocarcinomas including, but not limited to, papillary, nodular, and diffuse; lung cancers including, but not limited to, non-small cell lung cancer, squamous cell carcinoma (epidermoid carcinoma), adenocarcinoma, large-cell carcinoma and small-cell lung cancer; testicular cancers including, but not limited to, germinal tumor, seminoma, anaplastic, classic (typical), spermatocytic, nonseminoma, embryonal carcinoma, teratoma carcinoma, choriocarcinoma (yolk-sac tumor), prostate cancers including, but not limited to, adenocarcinoma, leiomyosarcoma, and rhabdomyosarcoma; penal cancers; oral cancers including, but not limited to, squamous cell carcinoma; basal cancers; salivary gland cancers including, but not limited to, adenocarcinoma, mucoepidermoid carcinoma, and adenoidcystic carcinoma; pharynx cancers including, but not limited to, squamous cell cancer, and verrucous; skin cancers including, but not limited to, basal cell carcinoma, squamous cell carcinoma and melanoma, superficial spreading melanoma, nodular melanoma, lentigo malignant melanoma, acral lentiginous melanoma; kidney cancers including, but not limited to, renal cell cancer, adenocarcinoma, hypernephroma, fibrosarcoma, transitional cell cancer (renal pelvis and/or ureter); Wilms' tumor; bladder cancers including, but not limited to, transitional cell carcinoma, squamous cell cancer, adenocarcinoma, carcinosarcoma.

In some embodiments, the cancers are characterized as having one or more mutations in the Adenomatous polyposis coli (APC) gene. The methods and compositions as described are useful for both prophylactic and therapeutic treatment.

Therapeutic treatment involves administering to a subject a therapeutically effective amount of the compositions or pharmaceutically acceptable salts thereof as described after cancer is diagnosed.

In further embodiments, the compositions are used for prophylactic use i.e., prevention, delay in onset, diminution, eradication, or delay in exacerbation of signs or symptoms after onset, and prevention of relapse. In some embodiments, the subject has adenomatous polyp (adenomas) of the colon and/or rectum that are benign (noncancerous) growths but may be precursor lesions to colorectal cancer. For prophylactic use, a therapeutically effective amount of the compounds and compositions or pharmaceutically acceptable salts thereof as described are administered to a subject prior to onset (e.g., before obvious signs of cancer), during early onset (e.g., upon initial signs and symptoms of cancer), or after an established development of cancer. Prophylactic administration can occur for several days to years prior to the manifestation of symptoms. Prophylactic administration can be used, for example, in the chemo-preventative treatment of subjects presenting precancerous lesions, those diagnosed with early-stage malignancies, and for subgroups with susceptibilities (e.g., family, racial, and/or occupational) to particular cancers.

1. Adenomatous Polyposis Coli (APC) Mutation and Associated Cancers

Adenomatous polyposis coli (APC) is widely accepted as a tumor suppressor gene highly mutated in colorectal cancers (CRC). Mutation and inactivation of this gene is a key and early event almost uniquely observed in colorectal tumorigenesis. Alterations in the APC gene generate truncated gene products, leading to activation of the Wnt signaling pathway and deregulation of multiple other cellular processes.

Thus, in some embodiments, the composition and pharmaceutical formulations thereof are suitable for use in treating one or more symptoms of cancers associated with one or more mutations or inactivation in the APC gene. In preferred embodiments, the composition and pharmaceutical formulations thereof are suitable for use in treating one or more symptoms of colon cancer associated with one or more mutations or inactivation in the APC gene.

VI. Kits

Medical kits are also disclosed. The medical kits can include, for example, a dosage supply of a GSK-3 inhibitor encapsulated in nanoparticles, in an amount effective to increase Wnt signaling activity in cancer cells in vivo. The active agents can be supplied alone (e.g., lyophilized), or in a pharmaceutical composition. The active agents can be in a unit dosage, or in a stock that should be diluted prior to administration. In some embodiments, the kit includes a supply of pharmaceutically acceptable carrier. The kit can also include devices for administration of the active agents or compositions, for example, syringes. The kits can include printed instructions for administering the compound in a use as described above.

The present invention will be further understood by reference to the following non-limiting examples.

EXAMPLES

Example 1: Screening GSK3αβ Inhibitors for their Capacity to Support Colon Organoid Growth Material and Methods Mouse and human organoids were grown in standard organoid culture systems using MATRIGEL® and Advanced DMEM/F12 media with 5% fetal bovine serum, and GLUTAMAX® supplementation. Dose responses of the labeled drugs were applied to the organoid cultures and resazurin viability assays were performed after 4 days of culture. Relative growth is assessed by conversion of resazurin to resorufin and is shown on the y axis.

Results

The screen of various drugs highlights that LY2090314 potently permits the growth of wildtype colon organoids over a broad range of drug concentrations in comparison to the more limited range and absolute growth of some of the other GSK3 inhibitors (FIG. 1).

Figure 2:
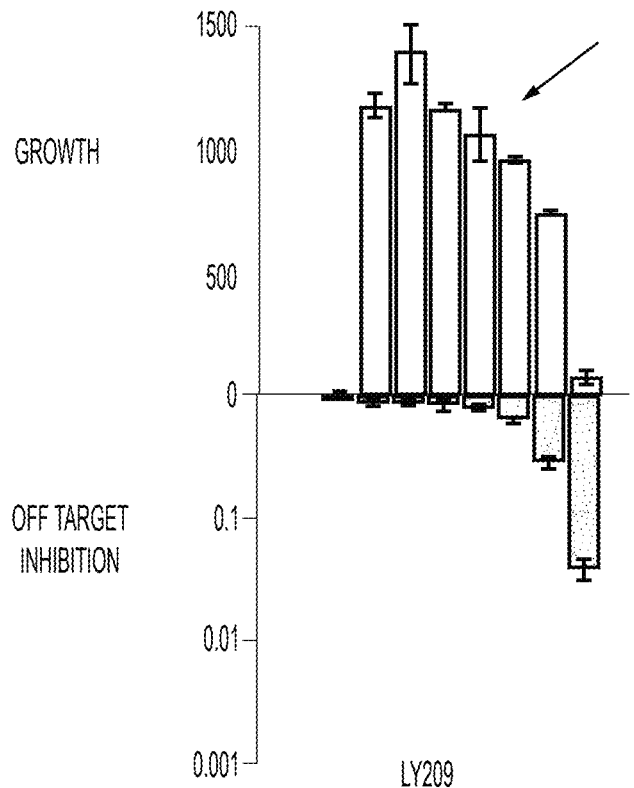
FIG. 2 is a bar graph showing growth rate of cells versus concentration of LY2090314, with growth (0-1500) and Off-target inhibition (0-0.001) indicated above and below the threshold for 0 growth rate, respectively. The point at which growth rate is diminished and off target inhibition is initiated is indicated by an arrow.

Based on on-target vs off-target function in organoids, the best drugs in decreasing order of efficacy are: LY2090314 (FIG. 2), SAR502250, A-1070722, and CHIR 99021. Most of the others showed limited on-target to off-target characteristics and may work by other mechanisms especially in colonic epithelial cells.

Example 2: GSK3 Inhibition Potently Inhibits Complex Colon Cancer Organoid Genotypes that are $APC^{-/-}$ at all Concentrations Material and Methods Same as FIG. 1, but the genotype of the organoids tested vary instead of being wildtype, they contain the mutations as indicated in the figure description.

Results

Figure 3:
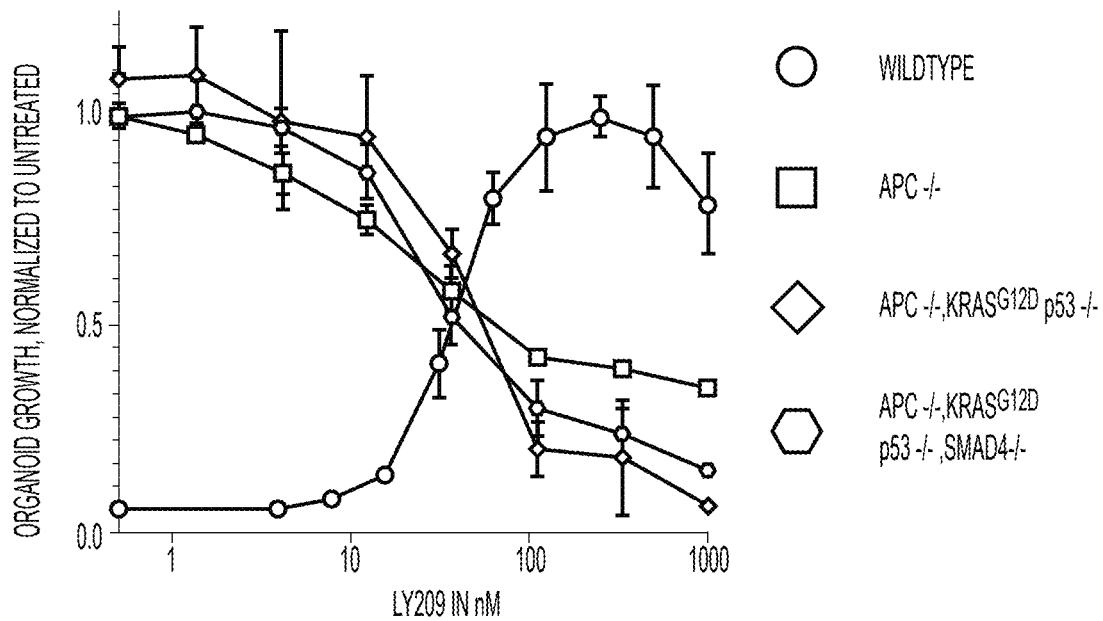
FIG. 3 is a line graph showing organoid growth, normalized to untreated (0-1.4) versus concentration of LY2090314 (0-1,000 nm) in each of wildtype (⊟), APC-/- (⊟), APC-/-, $KRAS^{G12D}$p53-/- (⊟), and APC-/-, $KRAS^{G12D}$, and p53-/- SMAD4-/- (⊟) cells, respectively.

At all concentrations, LY2090314 inhibited the growth of organoids that harbor an APC mutation, which was conserved even as additional cancer-causing mutations were added on top of APC mutations (FIG. 3). This is in comparison to the general improvement in growth that can be seen on wildtype organoid growth, highlighting the differential susceptibility vs growth of GSK3 inhibition on tumor organoids.

Example 3: Nanoparticle Formulation of GSK3αβ Inhibitors

Material and Methods

Nanoparticles were formulated using PLGA 5-10 k mw, 50:50 lactic to glycolic ratio. There were synthesized using a double emulsion technique with 2% soy lecithin as the emulsifier. LY2090314 was encapsulated at 0.1 mg/ml and 1:100 mg/mg w/w to PLGA in the double emulsion, with dichloromethane as the solvent. 2 min of 75 W sonication power via tip probe was used to induce the emulsification. The particles were stir-dried overnight at room temperature.

Results

Figure 4:
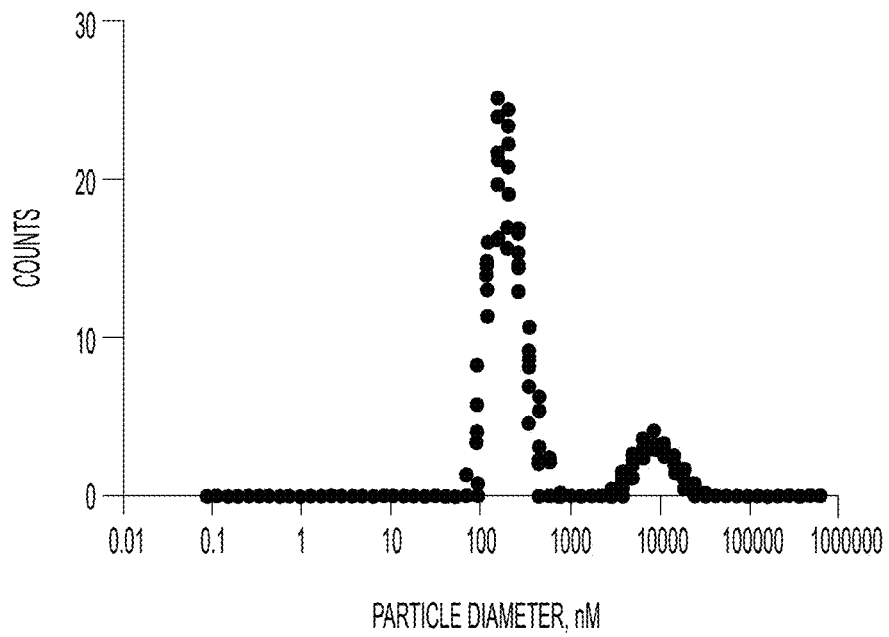
FIG. 4 is a graph of LY nanoparticle size distribution, showing counts (0-30) over particle diameter (0-1000,000 nm).

DLS results show the particles have a poly-dispersed size range that has a bimodal distribution of 500 nm and 10,000 nm (FIG. 4).

Example 4: Treating Peritoneal Carcinomatosis Using GSK3αβ Inhibitors Formulated in Nanoparticles in a Mouse Model Material and Methods Mouse colon tumor organoids were injected into the peritoneum of B6 mice. These tumor organoids were of the APC−/− KRAS (G12D), P53−/− genotype, the most common genotype of human colon cancer. Daily injections of the previously described nanoparticles containing LY2090314 were given to one arm, the treated group, while the other untreated group was given nothing. Since the tumors also express TdTomato fluorescent protein, the tumors were imaged via dissection microscopy after one week of treatment or no treatment.

Results

Figure 5A:
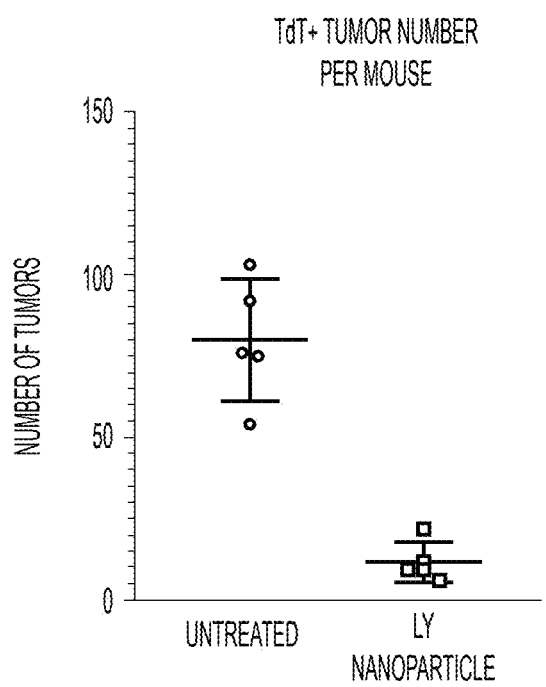
FIGS. 5A-5C show quantification of tumor burden with LY nanoparticle treatment.
Figure 5B:
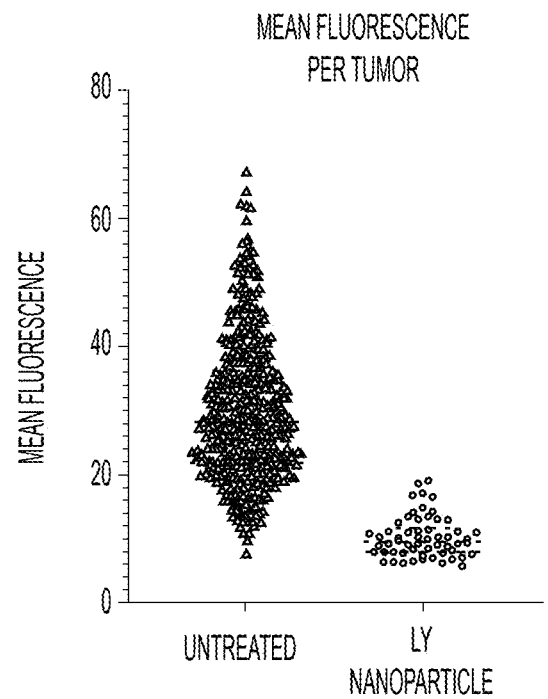
Figure 5C:
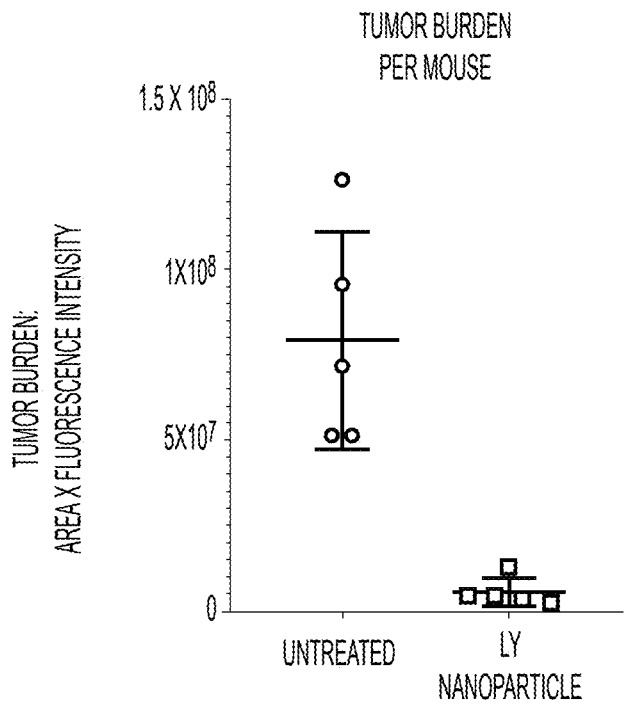

The number of tumors, average fluorescence, and overall tumor burden (mean fluorescence×area) of the treated vs untreated groups showed a statistically significant reduction in tumor burden in all metrics assessed (FIGS. 5A-5C). A 93% reduction in average tumor burden per mouse was observed.

Example 5: Enteral Formulations of LY Nanoparticles Increased Survival in a Mouse Model Material and Methods APC, Min/+ mice were treated by putting LY2090314-containing nanoparticles in their good for 2 weeks as indicated by the two dotted lines in FIG. 6. The dose was given about 2.5 mg/kg/day.

Results

Min (multiple intestinal neoplasia) is a mutant allele of the murine Apc (adenomatous polyposis coli) locus, encoding a nonsense mutation at codon 850. Like humans with germline mutations in APC, Min/+ mice are predisposed to intestinal adenoma formation. Min mice provide a good animal model for studying the role of Apc and interacting genes in the initiation and progression of intestinal and mammary tumorigenesis.

Figure 6:
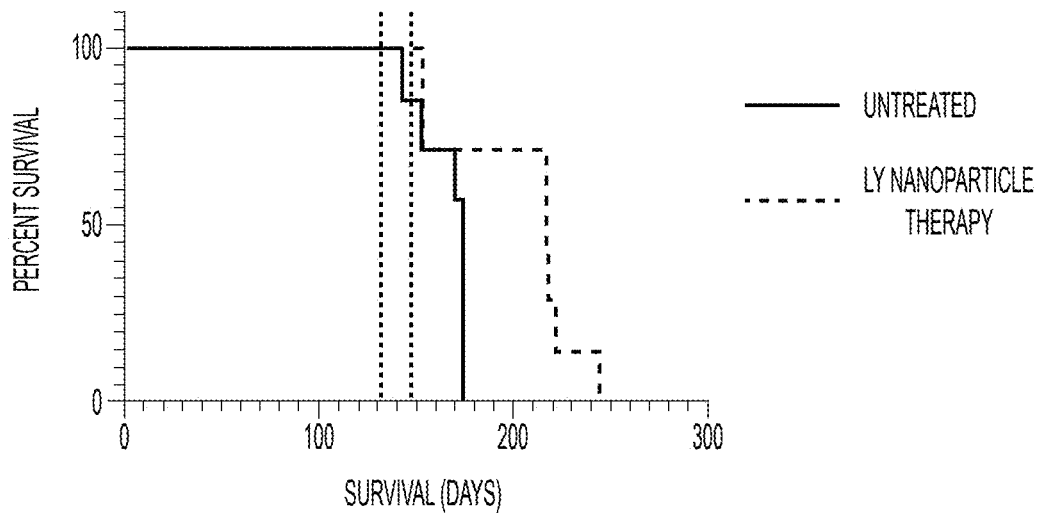
FIG. 6 is a graph of percent survival of APC min mice in a control group versus those in a treatment group in which the mice were treated with 2.5 mg/kg/day LY nanoparticle in their food for 2 weeks. The treatment window is indicated with two dotted lines.

Data show that nanoparticles carrying the drug increased gut regeneration in the setting of disease and directly stimulate the underlying stem cells and would likely treat adenomas. When the nanoparticles were incorporated in the food of tumor prone mice (APC min model) survival was significantly improved by enteral food-based delivery to the tumor prone mouse gut (FIG. 6). However, formulations would need to increase luminal residence time and limit systemic absorptions as we would want to treat the full length of the gut, and thus combination with PHA nanoparticles or other carriers which limit early small intestinal absorption would be ideal. Enema would also be something that would likely work and may be the best delivery method for colonic or rectal cancer.

Example 6: Human Colon Cancer Cells are Sensitive to the GSK3αβInhibitor, LY2090314

Material and Methods

Human colon cancers were collected from the operating room at MGH. Colon tumor organoids lines were generated from the resections and maintained in standard colon organoid culture conditions. Dose responses of LY2090314 were applied to the various human colon cancers and resazurin cell number counts were performed after 4 days of culture.

Results

Figure 7:
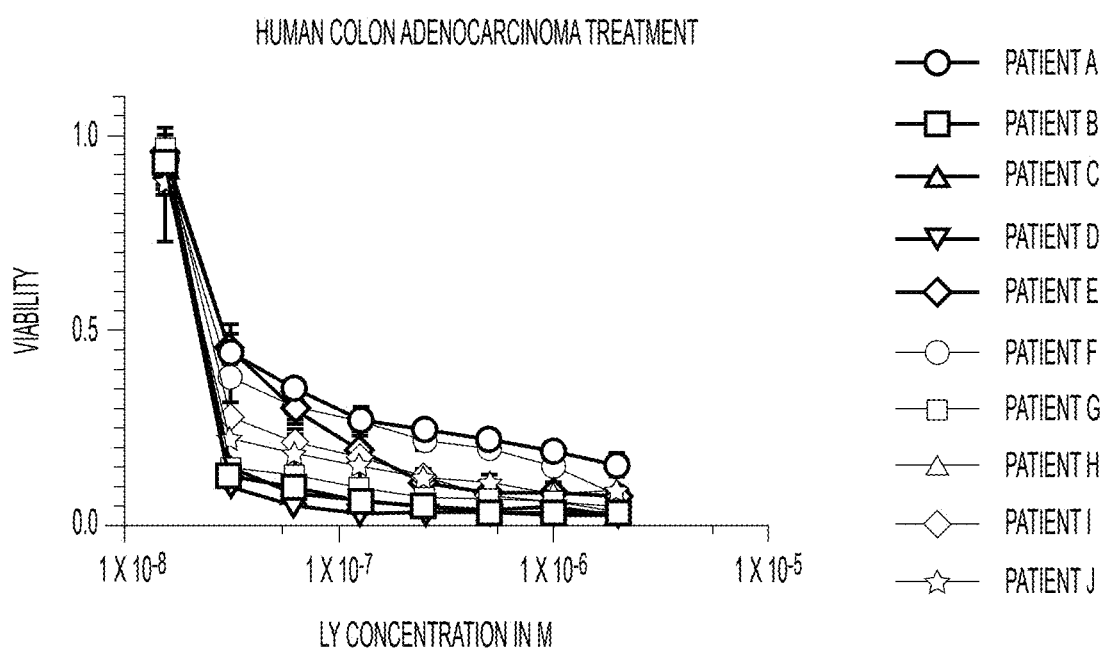
FIG. 7 is a graph of Human adenocarcinoma treatment, viability (0-1.1) versus LY concentration in M ($0-1.5\times10^{-5}$) for each of patients A (⊟), B (⊟), C (⊟), D (⊟), E (⊟), F (⊟), G (⊟), H (☐), I (⊟), and J (⊟), respectively.

Every human colon cancer showed susceptibility to LY2090314, validating this phenomenon is applicable from mouse studies to human derived colon cancer (FIG. 7).

Additionally, the use of concentrated WRN or Wnt3a, R-Spondin3, and Noggin showed inhibitory capacity of the concentrated recombinant proteins on mouse colon cancer organoids in a dose dependent manner (FIG. 9).

Example 7: Combination Treatment Using the GSK3αβ Inhibitor, LY2090314, and Other Conventional Chemotherapeutic Agents 5-Fluorouracil (5-FU) is an essential component of systemic chemotherapy for colorectal cancer (CRC) in the palliative and adjuvant settings. Despite the encouraging progress in CRC therapy to date, the patients' response rates to therapy continue to remain low and the patients' benefit from 5-FU-based therapy is frequently compromised by the development of chemoresistance.

Figure 8A:
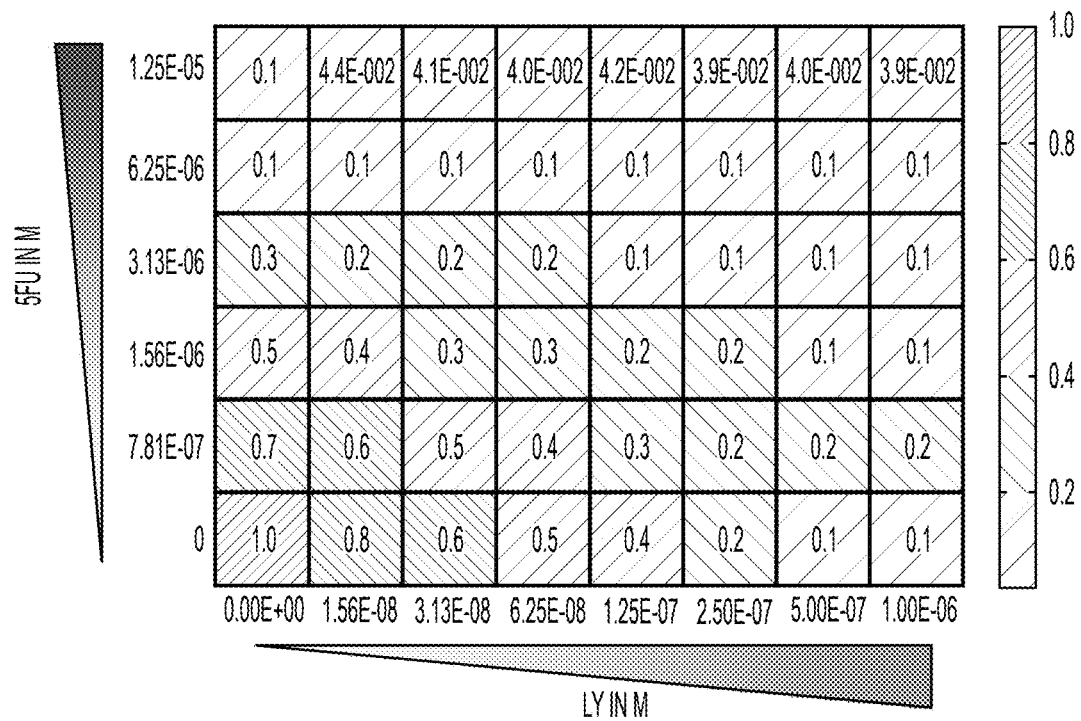
FIGS. 8A and 8B are graphs showing fractional survival of colon cancer organoids in the presence of increasing concentration of LY2090314 and 5-fluorouracil (5-FU).
Figure 8B:
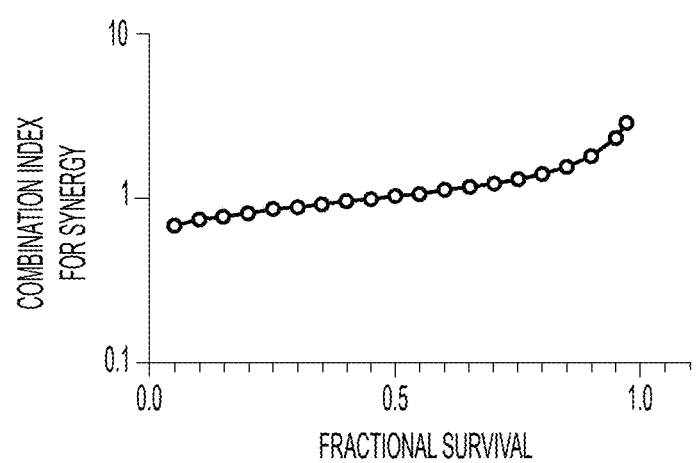

LY2090314 was used together with 5-FU on colon cancer organoids. Data show that this mechanism of cell killing or tumor inhibition by LY2090314 is independent of 5-FU (FIGS. 8A and 8B). The cell killing or tumor inhibition effect of LY2090314 is additive with 5-FU. Thus, LY2090314 can be added to many of the existing chemotherapy regimens for colon cancer with improved outcomes.

Example 8: Isolated Wnt Protein can Inhibit AKPVT Tumor Organoid Growth

FIG. 9 shows relative growth AKPVT (0-2.0), versus WRN concentration factor (0.125-32). Data demonstrated that isolated Wnt protein inhibited AKPVT tumor organoid growth at higher concentrations.

Example 9: In Vivo Results Using GSK3 Alpha −/−, GSK3 Beta −/−, KRAS G12D+/−, P53−/−, TdTomato shAPC (3ABKPT shAPC) Organoids Material and Methods Ten RAG2 immunocompromised mice were injected with 300,000 cells of 3ABKPT shAPC organoid cells, and split into two groups, those treated with doxycycline and those without. Doxycycline has been incorporated into their chow, at 625 mg/kg. At one week, the amount of TdTomato fluorescence was imaged and quantified.

Results

Figure 10A:
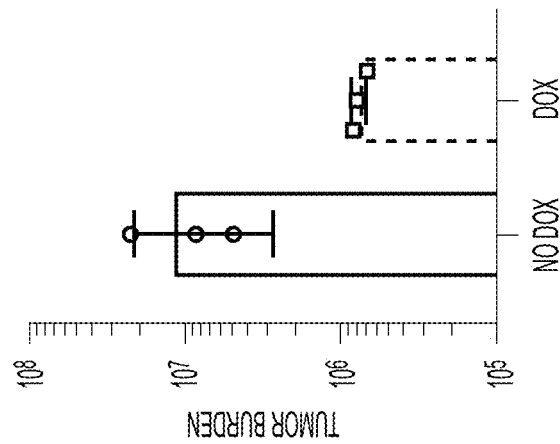
FIGS. 10A-10C are graphs showing number of tumors (FIG. 10A), mean fluorescence per tumor (FIG. 10B), and tumor burden (FIG. 10C) in mice treated with doxycycline (Dox) or control without doxycycline (No Dox).
Figure 10B:
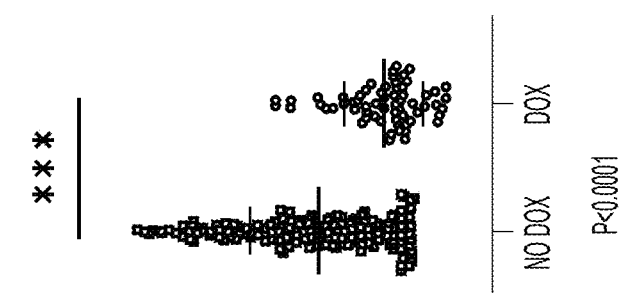
Figure 10C:
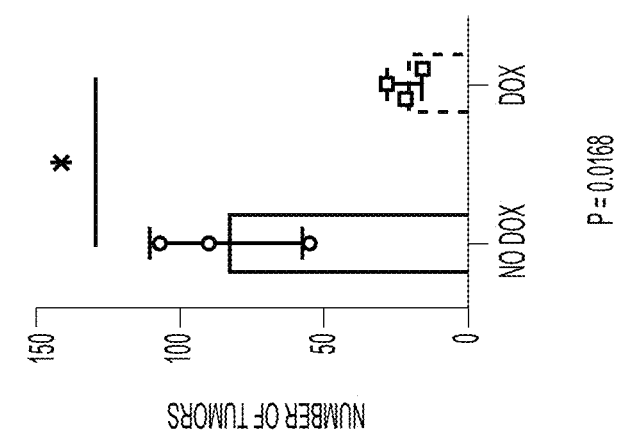

These organoids are Wnt independent through double knockout of GSK3, both alpha and beta genes. They also harbor mutations in KRAS and both copies of P53 such that they otherwise mimic those oncogenic signaling pathways in human colon cancer. They express TdTomato from the Rosa locus and are constitutively red fluorescent once activated into tumors. The shAPC construct permits doxycycline dependent knockdown of APC. Using this system, the effect of APC knockdown can be shown in the setting of GSK3 alpha and beta loss, the exact opposite to GSK3 drug inhibition in the setting of genetic APC loss. This further extends the concept of synthetic vulnerability by inhibition or knockdown of GSK3 alpha and beta with APC, but does so without use of a GSK3 inhibitor, and also shows that APC knockdown in the setting of GSK3 alpha and beta loss can mediate this effect as well (FIGS. 10A-10C).

Figure 11:
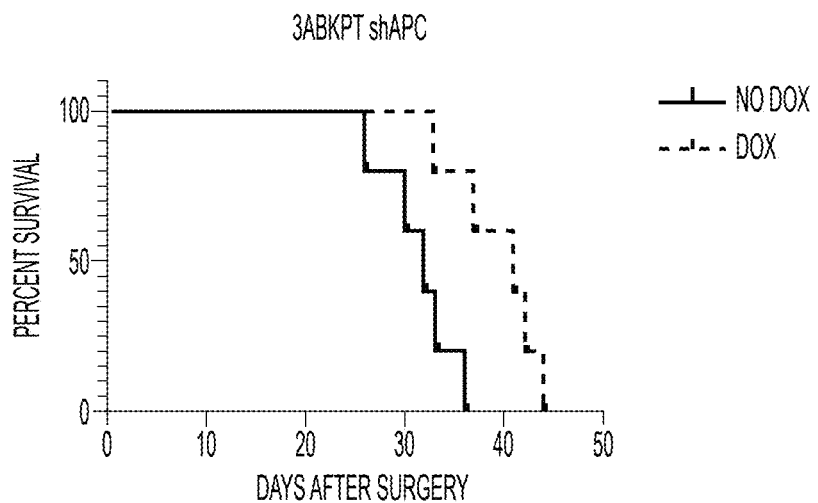
FIG. 11 is a Kaplan Meier plot showing percent survival versus days after surgery in mice treated with doxycycline (Dox) or control without doxycycline (No Dox).

When a similar experiment was conducted using a splenic injection model of metastatic tumor growth instead of peritoneal carcinomatosis, similar results were observed. In brief, GSK3ABKPT shAPC organoids were dissociated and 250,000 cells were injected into the spleens of mice. The spleens were removed after 5 min of perfusion and the tumors were allowed to grow in the livers of the mice, with or without doxycycline. The mice were maintained on either doxycycline-containing diet or control diet until they reached endpoint, as defined by euthanasia criteria, or died. There was a significant difference in mouse survival in those treated with doxycycline shown in the Kaplan Meier plot in FIG. 11.

Example 10: Enhanced Safety and Efficacy Compared to 5-Fluorouracil

Figure 12A:
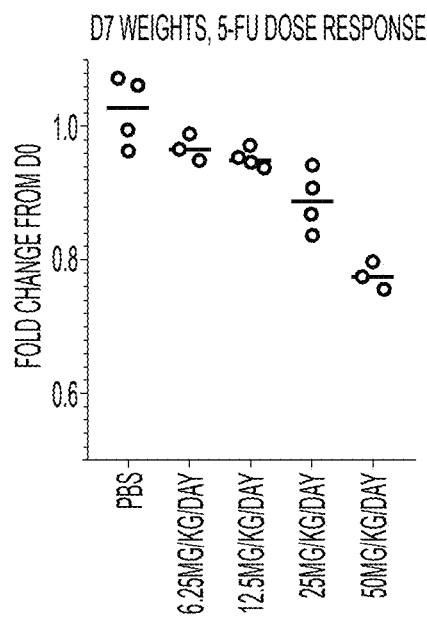
FIGS. 12A-12E are graphs showing change of body weight one week post administration of 5-Fluorouracil, relative to day 0, in mice treated with PBS, or 5-Fluorouracil at a dosage of 6.25, 12.5, 25, and 50 mg/kg/day (FIG. 12A); number of tumors (FIG. 12B), mean fluorescence per tumor (FIG. 12C), and tumor burden per mouse (FIG. 12D) in control mice and mice treated with 5FU; and change of body weight over a period of 8 days post administration of the LY2090314 nanoparticles used to treat disseminated colon cancer (FIG. 12E).
Figures 12B, 12C, 12D:
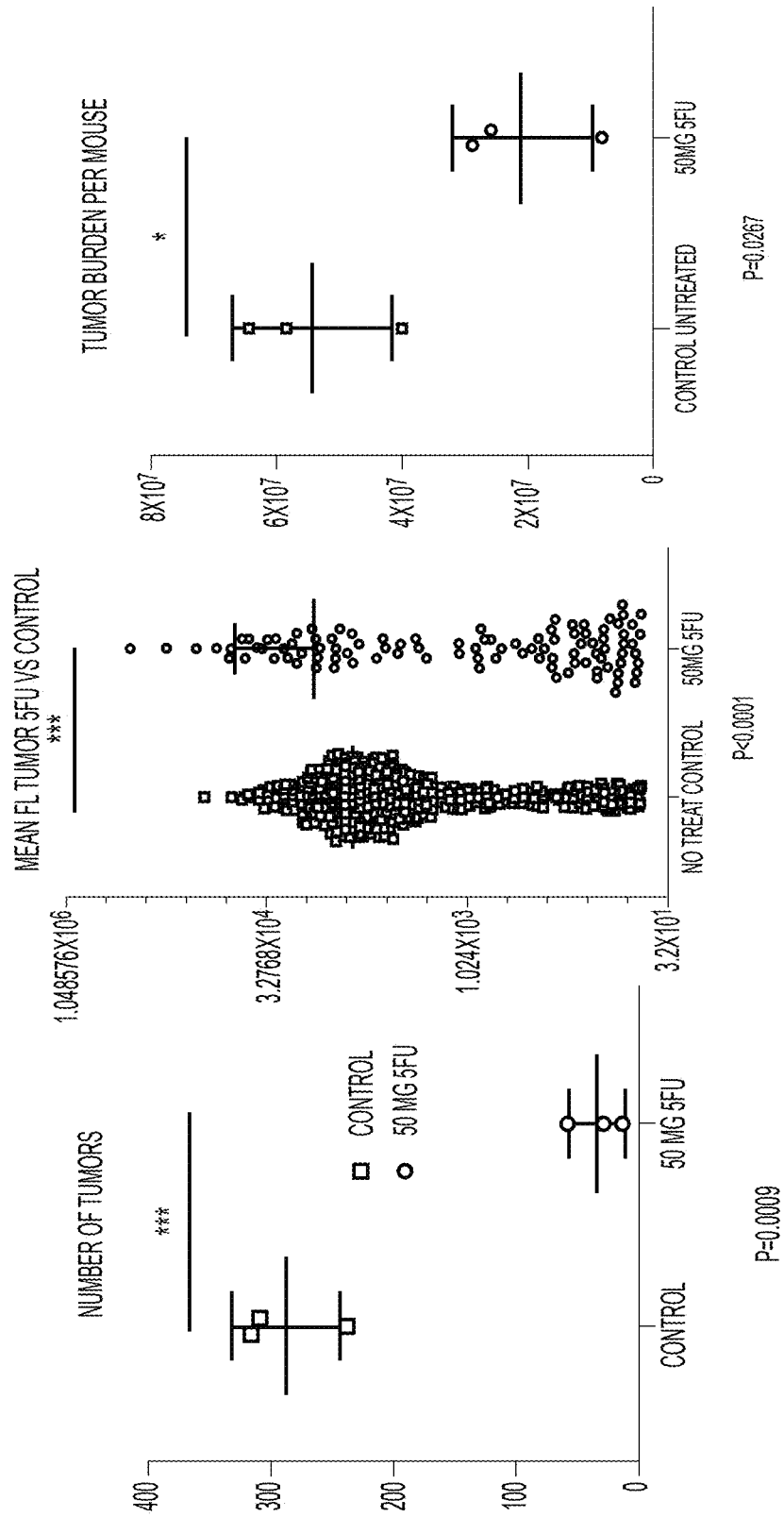
Figure 12E:
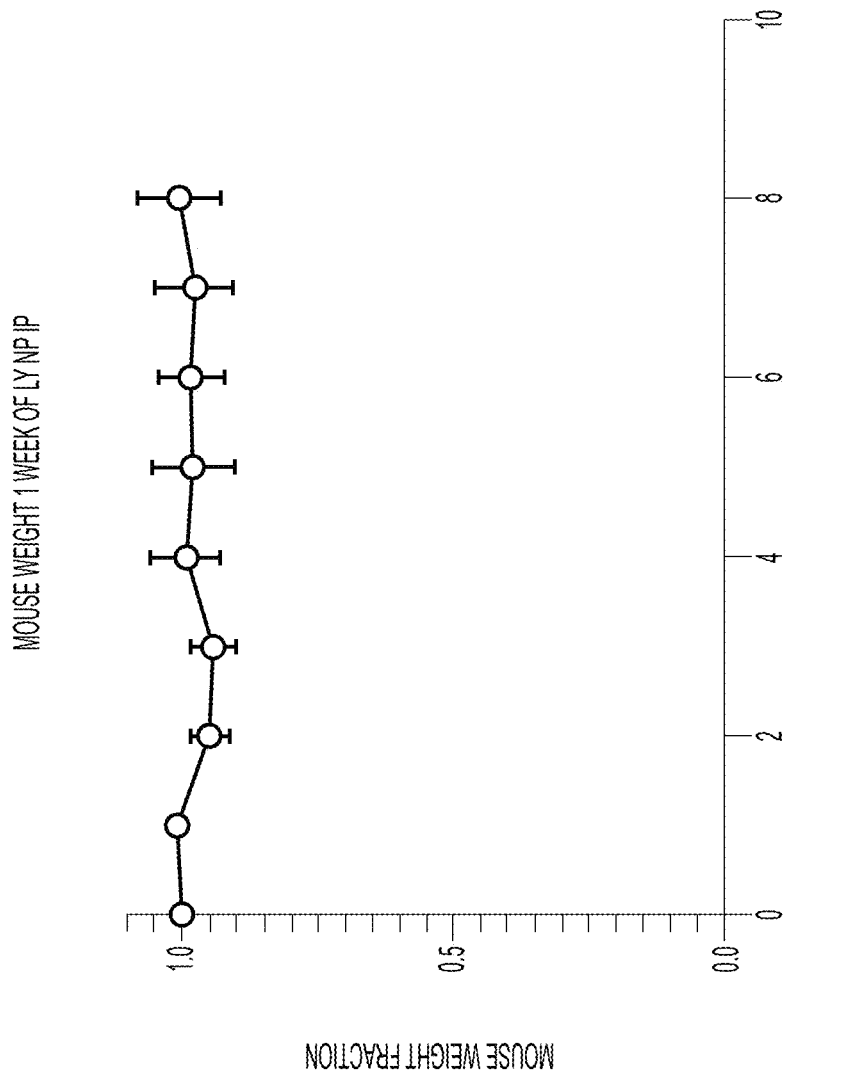

One of the most important facets of this treatment modality is the possibility for very limited side effects, and potentially improved normal cell growth, while simultaneously treating and killing colon cancer. In humans, the chemotherapy 5-Fluorouracil is a backbone of colon cancer therapy, however, has significant toxic side effects. Mice tolerate a higher dose of 5-Fluorouracil compared to humans on a per weight per day basis. When a high dose of 5-Fluorouracil is administered to mice, they lose 20% of their total weight in one week (FIG. 12A). This resulted in clearance of tumor quantified in FIGS. 12B-12D. This is in direct contrast to the improved inhibition of tumor burden and treatment effect identified by using the nanoparticle formulation of LY2090314 (FIGS. 5A-5C). In addition to the improved preclinical efficacy of LY2090314 for treating and reducing the tumor burden, the mice showed minimal change in weight and were all active, and healthy appearing FIG. 12E.

Example 11: Additional Small Molecule Inhibitors

Figure 13A:
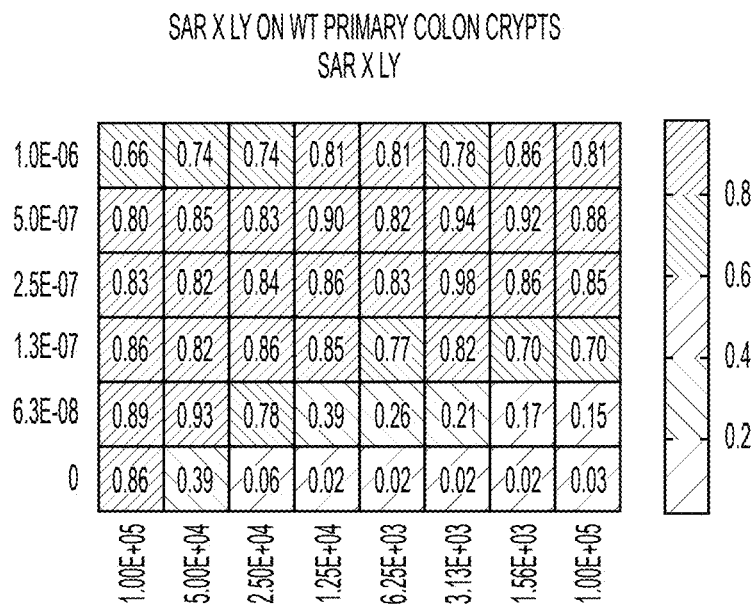
FIGS. 13A-13C are graphs showing a dose response of SAR502250×LY2090314 on wildtype colon organoids, demonstrating additive responses and independent capability to grow wildtype organoids for each drug on the x and y axis respectively (FIG. 13A); a dose response of SAR502250 on cancer organoids showing relative growth of AKPVT (0-1.5) at over a range of concentrations of SAR502250 from $6\times10^{-8}$ to $2\times10^{-5}$ (FIG. 13B); and a dose response of AZD2858 on wildtype organoid growth showing fluorescent units over a range of concentrations of AZD2858 from $1\times10^{-7}$ to $1\times10^{-4}$ (FIG. 13C).

To further generalize the approach using different GSK3 inhibitors, two other compounds were identified which via GSK3 inhibition, induce Wnt responses in colon organoids. Specifically, SAR502250 and AZD2858 show the capacity to grow normal wildtype organoids and promote a Wnt response based on the TOP-TdTomato reporter activity. Using primary wildtype colon crypts, the capacity of SAR502250 to promote wildtype organoid growth was evaluated using a resazurin metabolic based assay. LY2090314 is more potent than SAR502250, but SAR502250 can independently permit wildtype organoid growth (FIG. 13A).

Figure 13B:
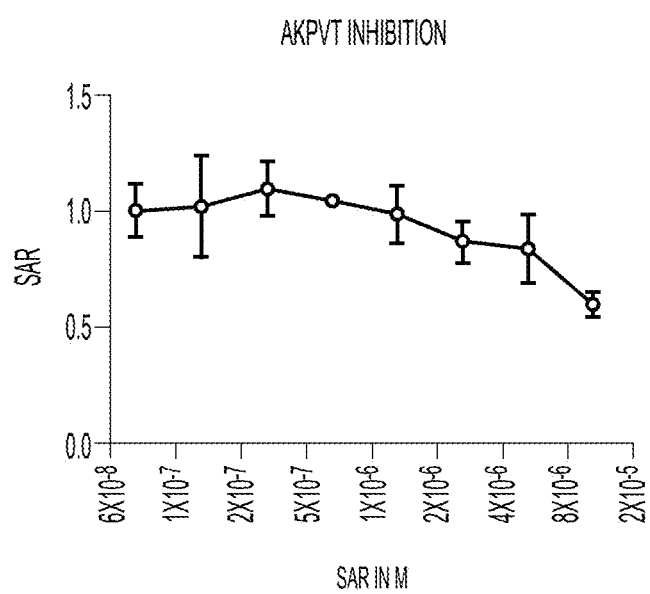

SAR502250 also inhibited colon cancer growth shown in FIG. 13B, where a dose response of the drug on colon cancer organoids (AKPVT, harboring mutations in APC, KRASG12D, P53 and are red fluorescent) demonstrates more modest inhibition than LY2090314, even at $2\times10^{-5}$M. Viability decrease was assessed using a resazurin based metabolic/proliferation assay.

Figure 13C:
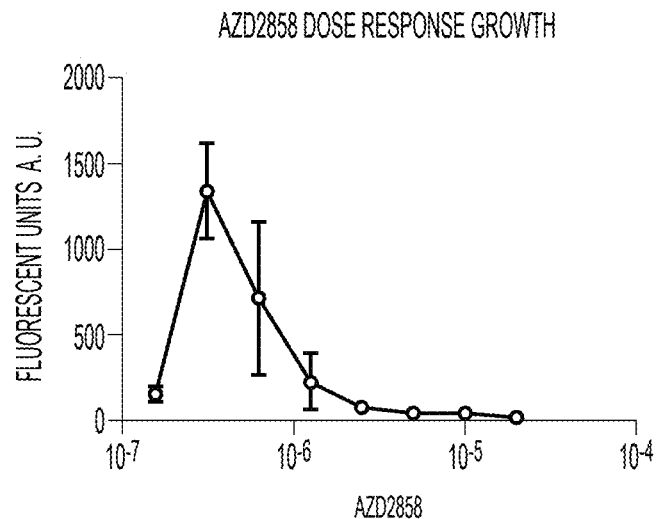

AZD2858 has also shown similar capacity to grow wild-type organoid cultures. When AZD2858 was applied to wildtype organoids, the drug demonstrated a clear low nanomolar capacity to support normal colon organoid growth FIG. 13C. Furthermore, this was confirmed to be on target Wnt signaling using the TOP/TdTomato reporter, after its genetic incorporation into the wildtype organoids.

Example 12: Combination Treatment Using R-Spondin and LY2090314

Figure 14:
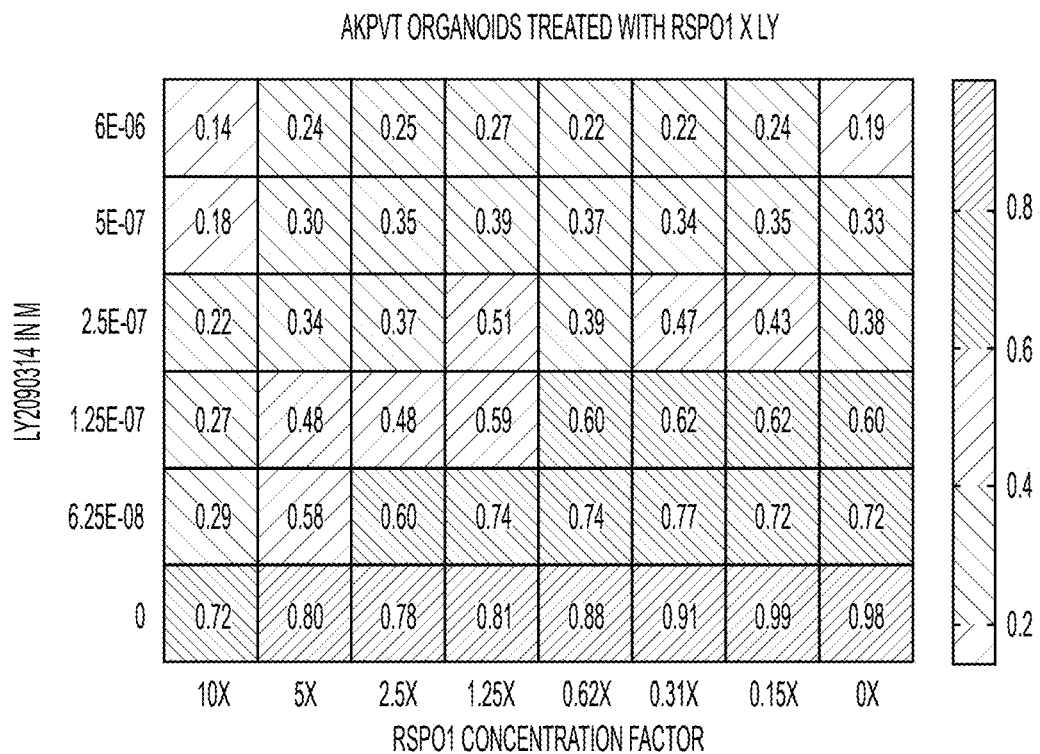
FIG. 14 is a two-dimensional dose response of RSPO1 by LY2090314 on inhibiting colon cancer organoid growth (AKPVT), assessed by resazurin based assay.

Here it has been shown that GSK3 inhibitor (LY2090314) has a synergistic effect when combined with a Wnt agonist. The combination increased the total capacity to inhibit tumor organoid growth (FIG. 14).

As shown in the following heat map, concentrated RSPO1 alone has modest effect to inhibit cancer organoids alone, bottom row. However, in the presence of low nanomolar LY2090314, the effect of RSPO1 on inhibiting colon cancer organoids can be more than additive of the results achieved by the individual components alone: where the reduction in viability on the organoids decreases by more than 40%, greater than each of the drugs alone.

Unless defined otherwise, all technical and scientific terms used herein have the same meanings as commonly understood by one of skill in the art to which the disclosed invention belongs. Publications cited herein and the materials for which they are cited are specifically incorporated by reference.

Those skilled in the art will recognize or be able to ascertain using no more than routine experimentation, many equivalents to the specific embodiments of the invention described herein. Such equivalents are intended to be encompassed by the following claims.

We claim:

1. A method for treating cancer with overactivated Wnt in a subject in need thereof, comprising administering to the subject an effective amount of a composition comprising nanoparticles comprising a synthase kinase 3 (GSK-3) inhibitor for increasing Wnt signaling activity in the cancer cells, wherein the GSK-3 inhibitor is selected from the group consisting of

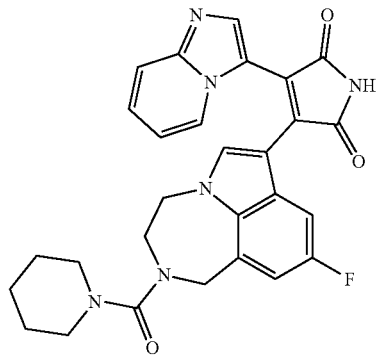

$C_{28}H_{25}FN_6O_3$ LY2090314,

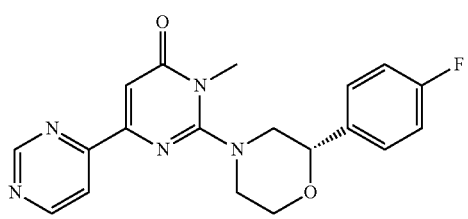 [SMILES: Cn1c(N2CCO[C@@H](c3ccc(F)cc3)C2)nc(-c2ccncn2)cc1=O]

$C_{19}H_{18}FN_5O_2$ SAR502250, and

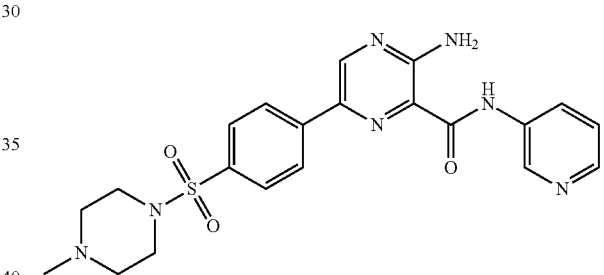

$C_{21}H_{23}N_7O_3S$ AZD2858, and a Wnt agonist to reduce cancer cell proliferation or viability in the subject.

2. The method of claim 1, wherein the amount of the composition does not reduce the proliferation and/or viability of healthy cells in the subject.

3. The method of claim 1, wherein the GSK-3 inhibitor is

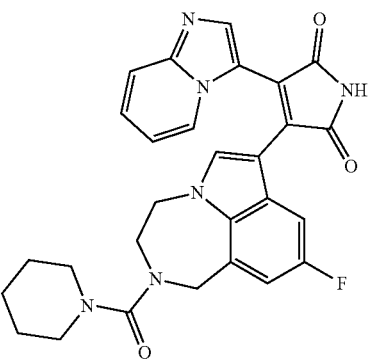 [SMILES: O=C1NC(=O)C(c2cnc3ccccn23)=C1c1cn2c3c(cc(F)cc13)CN(C(=O)N1CCCCC1)CC2]

$C_{28}H_{25}FN_6O_3$, LY2090314.

4. The method of claim 1, wherein the GSK-3 inhibitor in the nanoparticles, and
wherein the serum half-life of the GSK-3 inhibitor encapsulated in the nanoparticles is increased as compared to the serum half-life of the same amount of the GSK-3 inhibitor that is not in nanoparticles.

5. The method of claim 1, wherein the nanoparticle is a polymeric nanoparticle.

6. The method of claim 5, wherein the polymeric nanoparticle comprises poly(lactic-co-glycolic acid) (PLGA) and/or polyhydroxyalkanoates.

7. The method of claim 1, wherein the composition for increasing Wnt signaling activity comprises an isolated Wnt-3a protein.

8. The method of claim 1, wherein the cancer cells are characterized by increased Wnt signaling activity as compared to normal control cells.

9. The method of claim 1, wherein the cancer cells have one or more mutations in the adenomatous polyposis coli (APC) gene.

10. The method of claim 1, wherein the cancer is selected from the group consisting of colon cancer, rectal cancer, peritoneal carcinomatosis, pancreatic cancer, adenocarcinoma, ovarian cancer, multiple myeloma, and sarcomas, of pancreas, bone, bladder, brain, breast, cervical, esophageal, kidney, liver, lung, nasopharyngeal, prostate, skin, stomach, and uterine.

11. The method of claim 1, wherein the cancer is colon cancer.

12. The method of claim 1, wherein the composition comprises a pharmaceutically acceptable excipient for administration to the subject.

13. The method of claim 1, wherein the composition is administered to the subject by a route selected from the group consisting of intravenous, intramuscular, intravascular, intrathecal, intraperitoneal, subcutaneous, intraarticular, and oral.

14. The method of claim 1, further comprising administering to the subject one or more additional active agents selected from the group consisting of a chemotherapeutic agent, an anti-infective agent, and combinations thereof.

15. The method of claim 1 further comprising administering one or more immune checkpoint modulators selected from the group consisting of PD-1 antagonists, PD-1 ligand antagonists, and CTLA4 antagonists.

16. The method of claim 1, further comprising administering adoptive T cell therapy, and/or a cancer vaccine.

17. The method of claim 1, further comprising administering surgery or radiation therapy.

18. The method of claim 1, wherein the subject has undergone surgery to remove cancer and wherein the composition is administered to reduce the proliferation of cancer cells in the subject, and/or to enhance the growth of normal tissue in the subject.

19. A dosage form for injection or for oral administration comprising a GSK-3 inhibitor and a Wnt agonist,
wherein the GSK-3 inhibitor is selected from the group consisting of

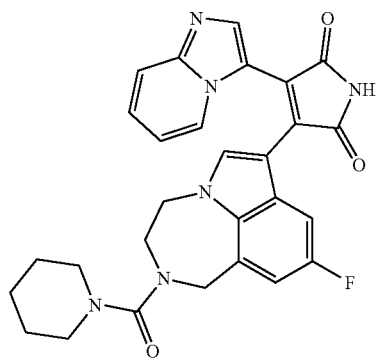 [SMILES: O=C1NC(=O)C(c2cnc3ccccn23)=C1c1cn2c3c(cc(F)cc13)CN(C(=O)N1CCCCC1)CC2]

$C_{28}H_{25}FN_6O_3$ LY2090314,

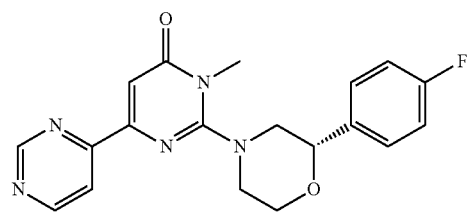 [SMILES: Cn1c(N2CCO[C@@H](c3ccc(F)cc3)C2)nc(-c2ccncn2)cc1=O]

$C_{19}H_{18}FN_5O_2$ SAR502250,

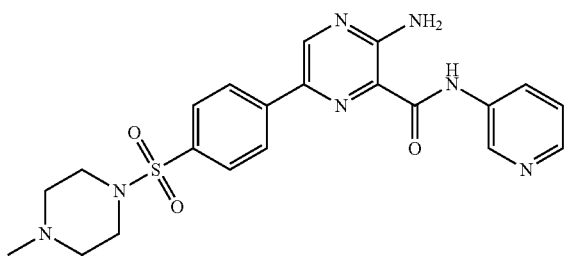 [SMILES: CN1CCN(S(=O)(=O)c2ccc(-c3cnc(N)c(C(=O)Nc4cccnc4)n3)cc2)CC1]

$C_{21}H_{23}N_7O_3S$ AZD2858 and combinations thereof,
wherein the GSK-3 inhibitor is encapsulated in nanoparticles,
wherein the GSK-3 inhibitor is in an amount effective to increase Wnt signaling activity in cancer cells of a subject and the combination of the GSK-3 inhibitor and the Wnt agonist is effective to reduce cancer cell proliferation or reduce cancer cell viability in the subject.

20. The dosage form of claim 19, wherein the amount effective to increase Wnt signaling activity in cancer cells does not reduce the proliferation or viability of healthy cells in the subject.

21. The dosage form of claim 19 wherein the GSK-3 inhibitor is

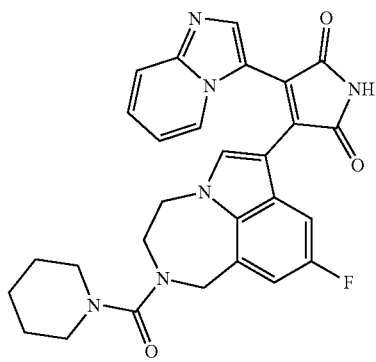 [SMILES: O=C1NC(=O)C(c2cnc3ccccn23)=C1c1cn2c3c(cc(F)cc13)CN(C(=O)N1CCCCC1)CC2]

$C_{28}H_{25}FN_6O_3$ LY2090314.

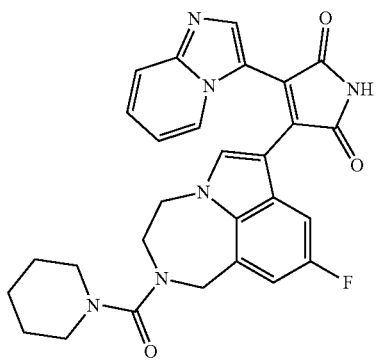 [SMILES: O=C1NC(=O)C(c2cnc3ccccn23)=C1c1cn2c3c(cc(F)cc13)CN(C(=O)N1CCCCC1)CC2]

$C_{28}H_{25}FN_6O_3$ LY2090314.

22. The dosage form of claim 19, wherein the cancer is selected from the group consisting of colon cancer, rectal cancer, carcinomatosis, pancreatic cancer, and adenocarcinoma.

23. The dosage form of claim 19, wherein the Wnt agonist is an isolated R-Spondin 1 protein or R-Spondin 3 protein.

24. A kit comprising the dosage form of claim 19 comprising a GSK-3 inhibitor encapsulated in nanoparticles in an amount effective to increase Wnt signaling activity in cancer cells of a subject and a Wnt agonist,
formulated for administration to a subject to reduce cancer cell proliferation or viability in the subject.

25. The dosage form of claim 19 comprising in combination an effective amount of a GSK-3 inhibitor, and a Wnt agonist,
wherein administration of the dosage form reduces cancer cell proliferation or viability, to a greater degree or for longer duration than administering to the subject the same amount of GSK-3 inhibitor alone or the same amount of Wnt agonist alone.

26. The dosage form of claim 25, wherein the GSK-3 inhibitor is

27. The dosage form of claim 25, wherein the Wnt agonist is an isolated R-Spondin 1 protein or R-Spondin 3 protein.

28. A method for treating cancer in a subject in need thereof, comprising administering to a subject an effective amount of the dosage form comprising a GSK-3 inhibitor and a Wnt agonist of claim 25.

29. The method of claim 28, wherein the dosage form of claim 27.

30. The method of claim 28, wherein the GSK-3 inhibitor and the Wnt agonist are administered via different routes and/or times within a treatment cycle.

31. The method of claim 1, wherein the Wnt agonist is an isolated R-Spondin 1 protein or R-Spondin 3 protein, or a derivative thereof having activity as a Wnt agonist.

32. The dosage form of claim 25 in a kit further comprising a chemotherapeutic agent.

33. The dosage form of claim 19, wherein the nanoparticles are polymeric nanoparticles.

* * * * *